United States Patent [19]

Xu et al.

[11] Patent Number: 4,975,834
[45] Date of Patent: Dec. 4, 1990

[54] MULTI-COMPUTER SYSTEM OF THE SAME ARCHITECTURE WITH COOPERATIVE CAPABILITY AND THE COOPERATING METHOD THEREOF

[76] Inventors: Zhaochang Xu, 1211/9 Beijing Xi Lu, Shanghai, China; Dongming Wu, 8 Lynnfield Dr., Morristown, N.J. 07960

[21] Appl. No.: 100,880

[22] Filed: Sep. 25, 1987

[30] Foreign Application Priority Data

Sep. 27, 1986 [CN] China .................................. 86106695

[51] Int. Cl.⁵ .............................................. G06F 13/00
[52] U.S. Cl. ................................ 364/200; 364/228.3; 364/229.2; 364/247.2; 364/228.7; 364/229; 364/230; 364/230.3; 364/230.4; 364/239; 364/239.5; 364/240; 364/240.1; 364/243; 364/260; 364/260.2; 364/262.4; 364/262.8; 364/271; 364/271.2; 364/271.6
[58] Field of Search ... 364/200 MS File, 900 MS File

[56] References Cited

U.S. PATENT DOCUMENTS

| | | | |
|---|---|---|---|
| 3,815,095 | 6/1974 | Wester ......................... | 364/200 |
| 4,219,873 | 8/1980 | Kober et al. ................. | 364/200 |
| 4,223,380 | 9/1980 | Antonaccio et al. ......... | 364/200 |
| 4,330,826 | 5/1982 | Whiteside et al. ........... | 364/200 |
| 4,365,294 | 12/1982 | Stokken ....................... | 364/200 |
| 4,387,425 | 6/1983 | El-Gohary ................... | 364/200 |
| 4,466,063 | 8/1984 | Segarra et al. .............. | 364/200 |
| 4,488,232 | 12/1984 | Swaney et al. .............. | 364/200 |
| 4,490,785 | 12/1984 | Strecker et al. ............. | 364/200 |
| 4,589,066 | 5/1986 | Lam et al. ................... | 364/200 |

Primary Examiner—Gareth D. Shaw
Assistant Examiner—Rebecca L. Rudolph
Attorney, Agent, or Firm—David H. Semmes

[57] ABSTRACT

A homogeneous multi-computer system comprises a system bus with a system data bus for transmitting data and a system management bus for transmitting system management signals, and a plurality of cell-computers having identical architecture and being connected to the system bus. Each cell-computer has a window device (WD), connected between an internal data bus (IDB) of the cell-computer and the system data bus, for controlling the on-and-off states of the system data bus to the IDB; an encoding and selecting device (NCD), connected to the IDB and system management bus, for generating a signal CST and a selected signal NCS representive of match of code sent by the system management bus with code of the present computer; a multi-computer control device (MCD), responding to the selected signal NCS from the NCD and under the trigger of the CST signal from the system management bus, for generating a set of control signals ($\overline{chfo}$, SYNC, CPT) and SSYNC signal to each cell-computer via the system management bus for each cell-computer to enter synchronous state; and a central processing unit (CPU), responding to the set of control signals from the MCD, for continuously generating signals during each machine cycle to determine whether the IDB and system data bus are on and the CPU, memory, and I/O devices are high impedance with respect to the IDB.

25 Claims, 16 Drawing Sheets

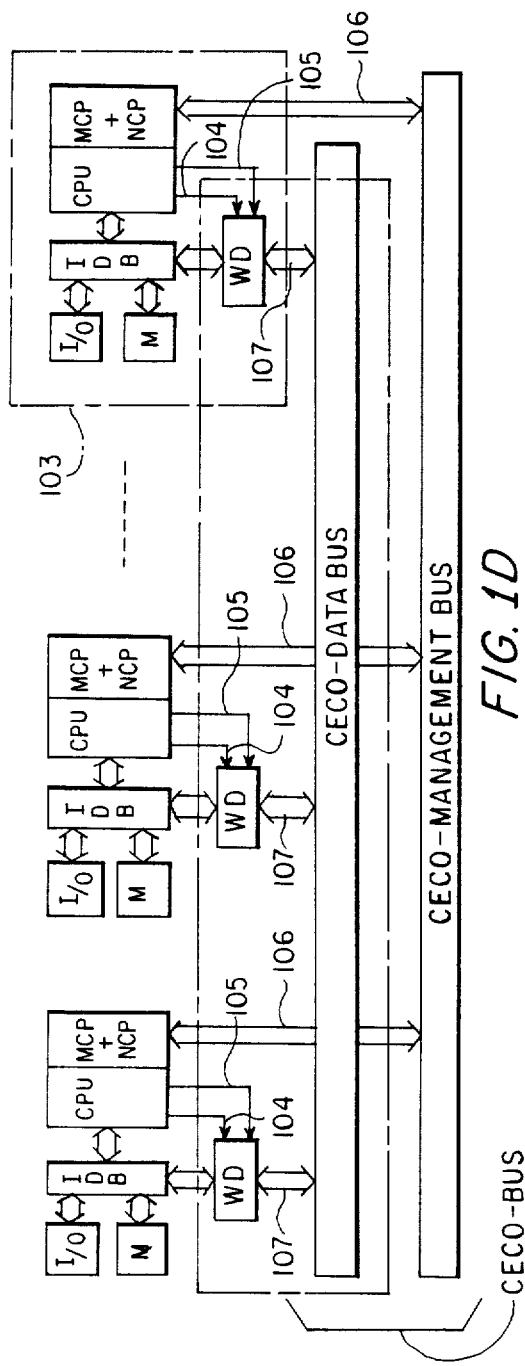
FIG. 1D
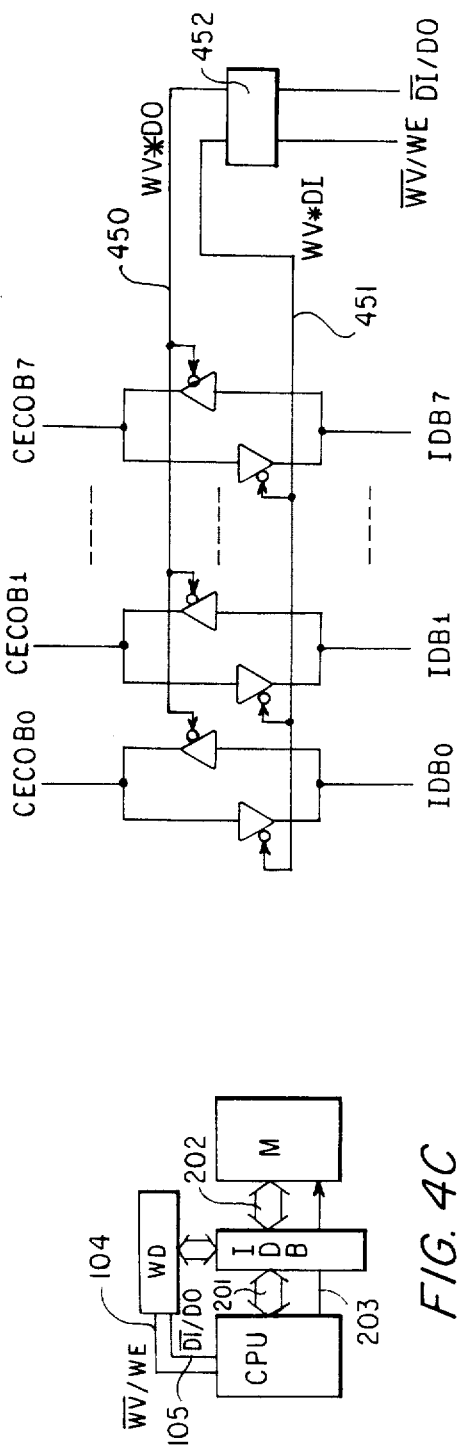
FIG. 4D
FIG. 4C

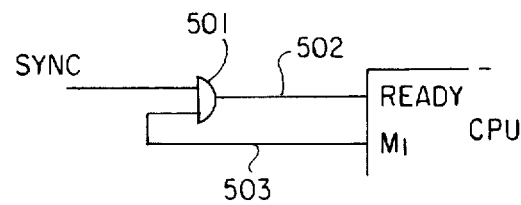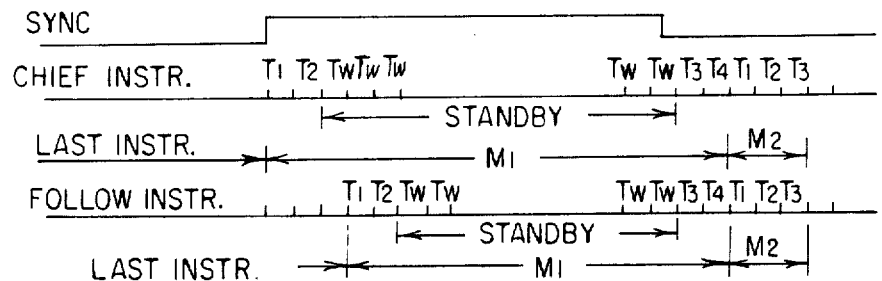
FIG. 5A
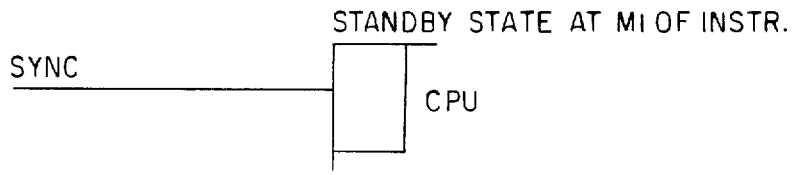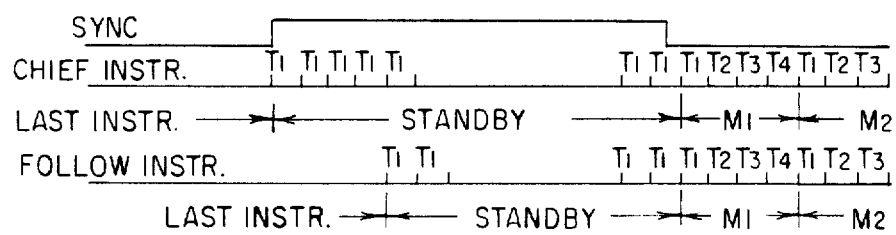
FIG. 5B

| ADDRESS | PC ADDRESSING | | | | MC TYPE OF REFERENCE COMPUTER |
|---|---|---|---|---|---|
| | CPT | | CHIEF/ FOLLOW | CECO-MC-FACTORS | |
| 0 | 0 | / | | (CV, MV, WE, /) | THE INSTR. SET OF RE- ENCE COMPUTER |
| 1 | | | | | |
| 2 | | | | | |
| 3 | | | | | |
| 4 | 1 | 0 FALSE | 0(CHIEF) | ADDITIONAL DECODING ARRAY (CECO-INSTR. FUNCTION DESIGN) | IN MASTOASE MC IS NO CHANGE |
| 5 | | | 1(FOLLOW) | | |
| 6 | | 1 TRUE | 0(CHIEF) | (CV, MV, WV, DO) | READ MC |
| 7 | | | 1(FOLLOW) | (CV, ME, WV, DI) | READ MC |

LOAD (HL),n

| MCs EXECU-TION IN INDIVIDUAL COMPUTER | M₁ | OPERATING CODE READ MC | | PC-ADDRESSING |
|---|---|---|---|---|
| | M₂ | CPU-N READ MC | | PC-ADDRESSING |
| | M₃ | (HL)-n WRITE MC | | NON-PC-ADDRESSING |

| MCs EXECU-TION IN CECO-INSTR. | NOTE | TRANSFER "n" FROM CHIEF TO FOLLOWERS | | |
|---|---|---|---|---|
| | | CHIEF | FOLLOW | SCHEMATIC OF TRANSFERRING |
| | M₁ | READ MC (CV,MV,WV,DO) | READ MC (CV,ME,WV,DI) | c→f→f→f / M M M M |
| | M₂ | READ MC (CV,MV,WV,DO) | READ MC (CV,MV,WV,DO) | c→f f f / M M M M |
| | M₃ | WRITE MC (CV,ME,WE,/) | WRITE MC (CV,MV,WE,/) | c f f f / M M M M |

*FIG. 6F*

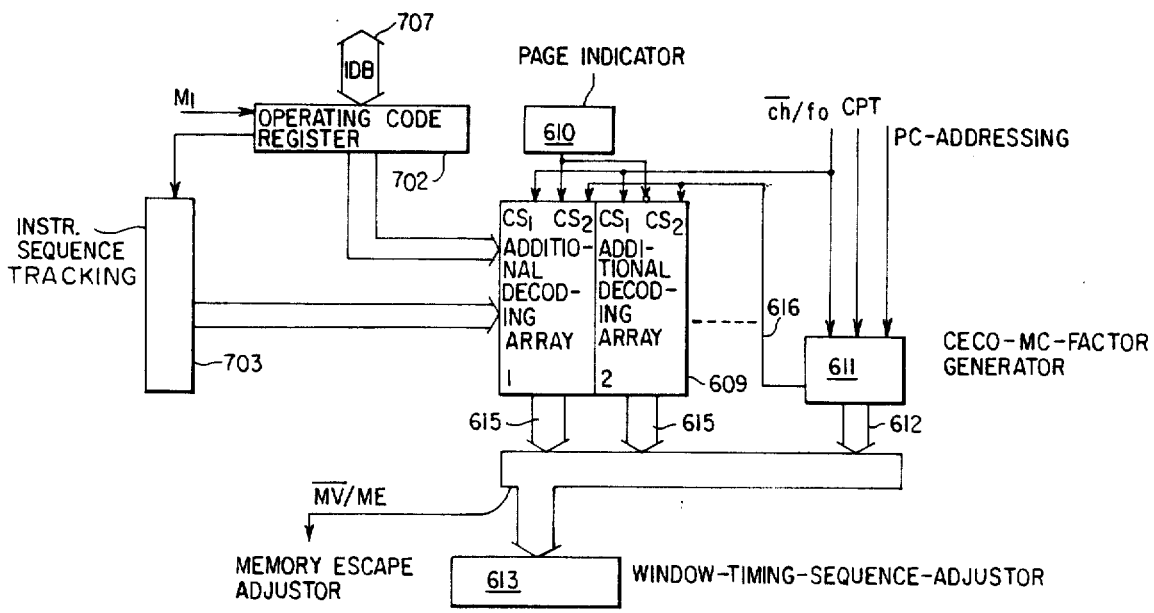

*FIG. 7*

| ORDER | ASSEMBLY INSTR. | CECO-INSTR. FUNCTION IN CHIEF COMPUTER | CECO-INSTR. FUNCTION IN FOLLOWING COMPUTER | SCHEMATIC OF TRANSFERRING |
|---|---|---|---|---|
| 01 | LD BC, B2 B3 | WD → BC ← B2, B3 | BC ← WP | |
| 02 | LD HL, B2' B3' | WD → HL ← B', B' | HL ← WP | |
| 03 | LD DE, B2" B3" | WD → DE ← B", B" | DE ← WP | |
| 04 | L1: LD A (HL) | WD → A ← (HL) | A ← WP | CECO-DATA BUS: CPU–WP–IDB (CHIEF) ··· CPU–WP–IDB (FOLLOW); (CV,MV,WV,DO) (CV,ME,WV,DI) |
| 05 | LD (DE), A | ← A | (DE) ← A | CECO: CPU–WP–IDB ··· CPU–WP–IDB; (CV,ME,WE,/) (CV,MV,WE,/) |
| 06 | DEC BC | BC ← (BC) − 1 | BC ← (BC) − 1 | |
| 07 | INC HL | HL (HL)+1 | HL (HL)+1 | |
| 08 | INC DE | DE (DE)+1 | DE (DE)+1 | |
| 09 | JP NZ, SL1 | | | IF BC=0 JUMP TO L1 |

*FIG. 6G*

MULTI-COMPUTER SYSTEM OF THE SAME ARCHITECTURE WITH COOPERATIVE CAPABILITY AND THE COOPERATING METHOD THEREOF

BACKGROUND OF THE INVENTION (1) Field of the Invention

This invention refers to a multi-computer system, and particularly to a homogeneous multi-computer system.

(2) Description of the Prior Art

Currently, parallel processing technique has been one of the main trends in the area of computer architecture and mainly takes multi-machine systems as its architecture. The aims of research and development are now focused on high speed operation and artificial intelligence, and some products have begun to be sold in markets. Being dominant in the computer market, the Von Neumann computer is still under development to increase its speed, memory capacity and other characteristics. However, the speed of the individual computer is limited by the space occupied by CPU and light speed so it is inevitable that parallel processing with multi-machine architecture will become the goal of development. Eric J. Lerner introduced some typical commercialized multi-machine system in the article "Parallel Processing Gets Down to Business", *High Technology* magazine in July 1985, as follows:

| Name | No. of Processors | Cycle (Time) (n) | Max. Speed | Memory | Other Feature |
|---|---|---|---|---|---|
| 1. MPP | 16384 | 100 | 65 BIPS | Dist. | small-grain |
| 2. Connection | 64000 | 1000 | 10 BIPS | Dist. | small-grain |
| 3. NONVON | 8000 | 1500 | 16 BIPS | Dist. | small-grain |
| 4. IPSC | 32–128 | 100 | 2–8 MFLOPS | Dist. | small-grain |
| 5. Butterfly | 128 | — | 200 MIPS | shared | large-grain |
| 6. Sigma-1 | 256 | 100 | 100 MFLOPS | Dist. | data flow |
| 7. Cedar | 32 | 100 | 10 MFLOPS | Shared | data flow | wherein, $BIPS = 10^9$ instructions per second $MFLOP = 10^6$ floating point instructions per second $MIPS = 10^6$ instructions per second From Lerner's paper and other information, it can be concluded that current research and development as well as the commercial prospects take features as follows:

A. This technology is in an expanding period; there are many concepts and designs as well as various types of classifications, but some serious difficulties.

B. High speed and artificial intelligence are being pursued and are expected to replace the supercomputers or supermini-computers.

C. Because the unit of a multi-computer system is independent, it is difficult to manage and program a multi-computer system. The number of large grain cell combination are not yet over 256.

D. Since the design of multi-machine architecture depends on the algorithm, the system is not able to be common.

E. Communication with point to point is the main way to connect between computers.

Although great efforts are made to improve the architecture of multi-machine systems, the progress achieved is lagging behind that of the individual computer. It is difficult to replace the individual computer with multi-machine system in the near future due to technical difficulties. Some papers do not consider it as a good omen (e.g. "Parallel Machines Take on Supercomputer, *High technology*, July 1985, p. 26) because of:

(1) Too many troubles in the management of a multi-machine system as compared with an individual computer.

(2) The software for multi-computer systems remains to be developed, and is quite different from traditional software.

In the International Conference on Parallel Processing held in 1985, IBM announced that it was developing an RP3 machine with hypercube and shared memory (ref. to "Research Parallel Processor Prototype (RP3). Introduction Architecture" by G. F. Pitten et al., p. 264).

*Electronics* magazine introduced the status of Western European and Japanese efforts in two papers, "Western Europe Looks to Parallel Processing for Future Computer" (p. 114. June 1985) and "Japan is Busy Trying to Make Manufacturable Data Flow Computer" (p. 111, June 1985).

In all system architectures mentioned above, the multi-computer architecture is superior in modularity and commonality, and it is of a potential advantage at cost. The advantages are more obvious for homogeneous multi-computer system. Two typical examples of multi-computer architectures are as follows:

1. COSMIC. It was the first one using hyper-cube connection. The system consists of $2^n$ computers each one providing n point-to-point connecting ports for communication. The system operates, in the mode of multi-instruction flow and multi-data flow (MIMD), on the basis of an algorithm of message passing. The description of this system can be found in the system IPSC manufactured by Intel Scientific Computers, Inc.

2. TRANSPUTER. It was another multi-computer system wherein each computer has three or four serial communication ports and performs communication among multicomputers at a serial speed 1 to 10 Mbit/sec. The language used is OCCAM.

Multi-computer systems have some advantages in architecture. However, they are more complex and programming of system management is more difficult. In conventional multi-computer systems, since each unit holds complete independence, the multi-computer system presented users with multiple independent instruction flows and communication connection among them. As system management, the mode of communication could merely provide weak multi-computer management capability compared with an individual computer. On the other hand, in application, the users' algorithm is restricted by the multiple instruction flows and communication to a great extend. Then only a limited amount of communication models can match with the architecture of multi-computers. Meanwhile, because the multi-computer management and the users' algorithm have to be operated on the basis of communication the multi-computer system cannot be in widespread use even though its commonality of unit is very good. In addition, a multi-computer system could not provide directly for users the usual single flow chart on the whole system.

SUMMARY OF THE INVENTION

A general object of the present invention is to provide a homogeneous multi-computer system (hereafter in brief, a CECOPUTER) system that comprises a number of cell-computers as units of the system, a data bus (hereafter in brief, CECO-data bus) for connecting the cell-computers and transferring data, and a management bus (hereafter in brief CECO-management bus) for transferring signals managing the system.

During operation of the CECOPUTER system, the transferring of a single data among computers of the system is executed in computer machine cycle (hereafter in brief, CECO-MC), then one instruction in the CECOPUTER system (hereafter in brief, CECO-instr. can handle the multicomputers operation, i.e, a lot of processing of a multi-computer system performed by hardware can now be done on the instruction level.

The CECO-instr. set of the individual computer are combined in page form. Thus a space having the same operation codes as those of an individual computer is formed, and a highly expandable and designable potential in CECO-instr. is adaptable for users' various algorithms and enhances the system management itself.

In addition, a cell computer which provides codes of CECO-instr. for the CECOPUTER system (named chief computer) leads the execution of CECO-instr. Thus this chief computer can not only operate independently but can also take the roles of the CECOPUTER systemp's managing and dispatching. Then a structure and algorithm like a single flow chart is presented to the user.

An object of this invention is to provide a cell computer that can be formed from a conventional individual computer by some regular alteration of structure and can be compatible on the level of machine code with the conventional individual computer. Meanwhile it can provide a new designable CECO-instr. set to meet new functional requirements.

Another object of this invention is to provide a cell-computer which can be used as either an individual computer or as a cell-computer for the CECOPUTER system.

Still another object of this invention is to provide a CECOPUTER system with a simple connection. This system comprises cell-computers and a CECO-bus (The CECO-bus is used to connect cell computers of the CECOPUTER system and consists of CECO-data bus and CECO-management bus) without any additional attachment.

A further object of this invention is to provide a window device connected between the CECO-data bus and an internal data bus (IDB) of the cell-computer. According to different window structures, various kinds of data transferring formats can be set up.

A still further object of this invention is to provide a chief computer controlling other cell-computers of the CECOPUTER system so as to take on the tasks of program development, fault diagnosis, etc.

Another object of this invention is to provide homogeneous cell computers at identical structure positions on the CECO-bus to realize redundancy and switch-over based on a cell-computer and to improve reliability of the system.

An object of this invention is also to provide a CECO-network structure under CECO-instr. In addition to communication, the CECO-network provides a forceful capability of system management, thereby the CECO-network can be used to replace conventional distributed computer network structure in some aspects.

An aspect of this invention is to provide a CECO-PUTER system in which a cell-computer has a minimum amount of pins so that it is possible to integrate the whole cell-computer into a single chip or package.

Another aspect of this invention is to provide a "dimensional device" used as a connecting port for cell-computers and CECO-bus which can make the cell-computers serve as connecting points of CECOPUTER systems, thereby the linear space of the CECOPUTER system will be expanded to a multi-dimensional space, a hierarchical tree structure, or other topological forms.

Still another aspect of this invention is to provide a combination of homogeneous cell-computers from one to thousands.

A further aspect of this invention is to enable the CECOPUTER and its combination to replace the conventional individual computer and the network structure combined by conventional computers and serve as the basic form of computer applications. Thereby the CECOPUTER system can have vast application for different fields and trends.

A feature of this invention is to provide a CECO-PUTER system that is easily compatible with various other techniques used in conventional individual computer or multi-computer systems, e.g. Co-processor, RISC, communication between neighbour-connection computers, shared memory, etc.

The preferred embodiment of a homogeneous multi-computer system according to the present invention comprises a system bus with a system data bus for transmitting data and a system management bus for transmitting system management signals, a plurality of cell-computers having identical architecture and being connected to said system bus. Each said cell-computer has a window device (WD), connected between an internal data bus (IDB) of said cell-computer and said system data bus, for controlling the on-and-off states of said system data bus to said IDB; an encoding and selecting device (NCD), connected to said IDB and said system management bus, through which the CST passes and a selected signal NCS is generated as output representative of match of code sent by said system management bus with code of the present computer; a multi-computer control device (MCD), responding to said selected signal NCS from said NCD and said CST signal, after passing through the NCD, activates a signal from said system management bus, for generating a set of control signals (ch/fo, SYNC, CPT) and SSYNC signal to each cell-computer via said system management bus for each said cell-computer to enter synchronous state; a central processing unit (CPU), responding to the set of control signals from said MCD within the same computer cell, for continuously generating signals during each machine cycle to determine whether said IDB and said system data bus are on and said CPU, memory, and I/O devices are high impedance with respect to said IDB.

Other objects, aspects, features and advantages of the invention will be best understood from the following description, taken in conjunction with the accompanying drawings.

BRIEF DESCRIPTION OF THE DRAWINGS:

FIG. 1D is a block diagram of system architecture of an embodiment according to this invention.

FIG. 4C is a schematic diagram of the connection relation among the CPU, memory (or I/O, WD and the IDB in the cell-computer according to this invention.

FIG. 4D is a circuit diagram of an embodiment of synchronous parallel window device (8-bits) shown in FIG. 4A.

FIG. 5A shows a timing diagram and a schematic diagram of a device as an embodiment synchronizing the cell-computers in the CECOPUTER system according to this invention.

FIG. 5B is another timing diagram and schematic diagram of a device as an embodiment synchronizing the cell-computers in the CECOPUTER system according to this invention.

FIG. 6F is an illustration showing the design of a CECO-instr. and its execution in the system according to this invention.

FIG. 6G shows the procedure whereby a data block in the chief computer is transferred to a designated area of follow computers in the CECOPUTER system by means of execution of CECO-instr. according to this invention.

FIG. 7 shows the development of a cell-computer based on an existing CPU to obtain a cell computer according to this invention.

Description will be given combined with the drawings as below. The symbols and the numbers appearing in different figures bear exactly the same meaning.

DETAILED DESCRIPTION OF THE INVENTION

Figure 1A:
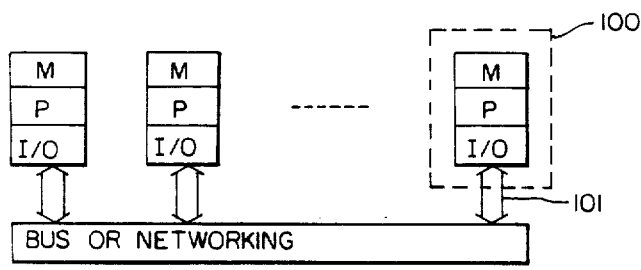
FIG. 1A is a block diagram of the distributed memory structure of conventional multi-computer system as prior art.

FIG. 1A is a block diagram of the distributed memory structure of a multi-computer system of the prior art, where M represents the memory; P the processor or CPU; I/O the input/output devices; 101 the connecting lines between the computer and the bus. They, in combination with other devices, form a conventional individual computer 100 that is present in the multi-computer system. This system could be managed by communication, macro command, etc. The signals or data transferred through the bus could be identified by the computer as macro command, then the macro command is executed by the computers. For communication, however, the messages are delivered, recognized, and executed by the computers. Therefore, it is difficult to control the instruction streams in this type of multi-machine system.

Figure 1B:
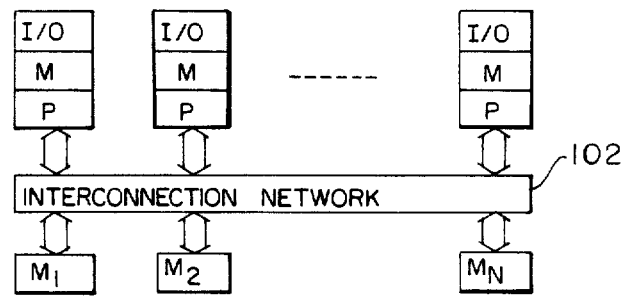
FIGS. 1B and 1C are block diagrams of conventional shared memories of multi-computer system as prior art.
Figure 1C:
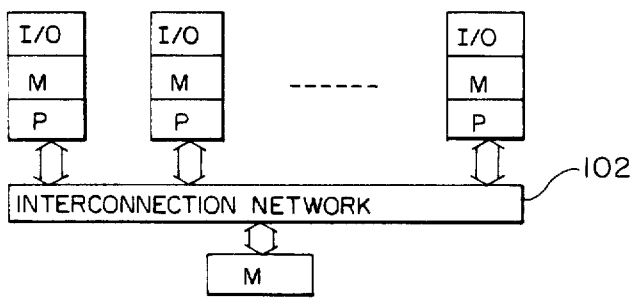

FIG. 1B and FIG. 1C are block diagrams of the shared memories of multi-computer systems of the prior art, wherein the computer is respectively connected to the memory through an interconnection network 102.

FIG. 1B is a block diagram of area separated shared memory, wherein $M_1 M_2 \ldots M_N$ represent N memories respectively. By interconnection network 102, memories are respectively connected to corresponding computers. Since the shared memory is directly addressed by corresponding computers during operation, the interconnection network 02 has to consist of addressing bus, data bus, control bus and their switches. As a result, the network itself is very complicated.

FIG. 1C is a block diagram of the centralized shared memory. The computer that holds the memory through the inter-connection network 102 is determined on the basis of either time division multiplex or the order of priority.

As compared with the I/O communication of the distributed memory structure shown in FIG. 1A, the communication of the system with shared memory is more convenient. However, as for the control of multi-instruction streams, all of the systems shown in FIGS. 1A-1C have difficulties of system management due to problems in their control modes.

FIG. 1D is a block diagram of an embodiment of the CECOPUTER system according to this invention. The CECOPUTER system comprises a number of cell computers 103 and a CECO-bus. In addition to a memory M, I/O devices, internal bus IDB and other devices pertaining to a conventional computer a cell computer 103 has also a window device WD, a CPU, an encoding and selection device NCD, and a multi-computer control device MCD, wherein the WD is controlled by the CPU and is not connected to the internal address bus of the cell-computer. By the control signals from lines 104 and 105 of the CPU, the enable/disable of the window device WD and the transferring direction of the data via the WD are determined. The WD, as the third type device to the IDB in addition tot he bus-master device (CPU) and bus-slave devices (memory or I/O), can also read from or write to the IDB under the control of signals from lines 104 and 105. The CECO-bus consists of a CECO data bus and a CECO management bus.

The operation process of the system shown in FIG. 1D is described as follows. When the CECOPUTER system starts to operate, a chief computer can be selected from N cell-computers in the CECOPUTER system, with the aid of hardware (for example, there is a pin $\overline{Sch}$/fo in MCD, when different voltage levels are applied to each pin, the chief computer and follow computers are selected), software, or the combination of hardware and software. For example, all the cell-computers are as follow computers when the power is on and they operate independently, an arbitor is established for these computers so as to determine the chief computer depending on their applications. (In addition, the chief computer can be alternated with follow computers by CECO-instr. When cooperative operation is needed by the CECOPUTER system, a program of the chief computer, written by the user, designates $n-1$ ($n \leq N$) cell-computers as follow computers to operate cooperatively. (If all of the cell computers in the CECOPUTER system are asked to operate cooperatively, then this above-mentioned operation is not necessary.) The chief computer sends a synchronous pulse to all cell computers in the CECOPUTER system through the CECO-management bus 106 to command that the chief computer and selected follow computers, after independently executing the current instruction being executed at this time of the synchronous pulse's arriving enter a standby condition at the beginning of the next instruction. At the trailing edge of the synchronous pulse, the chief computer and follow computers enter synchronization. Then, the window device controlled by the CPU in the chief computer send CECO-instr. code to the CECO data bus while window devices of the selected follow computers, controlled also by their own CPU, receive the CECO-instr. code from the CECO-data base bus. After that, this CECO-instr. is executed cooperatively by the chief computer and the follow computers. When the CECO-instr. is being executed, if needed, the cooperating cell computers can simultaneously or one-by-one restore the status of independent operation under the control of some CECO-instrs.

Figure 2A:
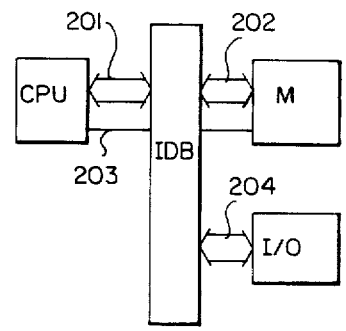
FIG. 2A is a schematic diagram of a conventional computer.

FIG. 2A is a schematic diagram of a conventional computer, omitting those parts such as address bus and control bus, etc. In comparing FIG. 2B with FIG. 2 A, the technical features of the cell computers according to this invention will be more clear.

Figure 2B:
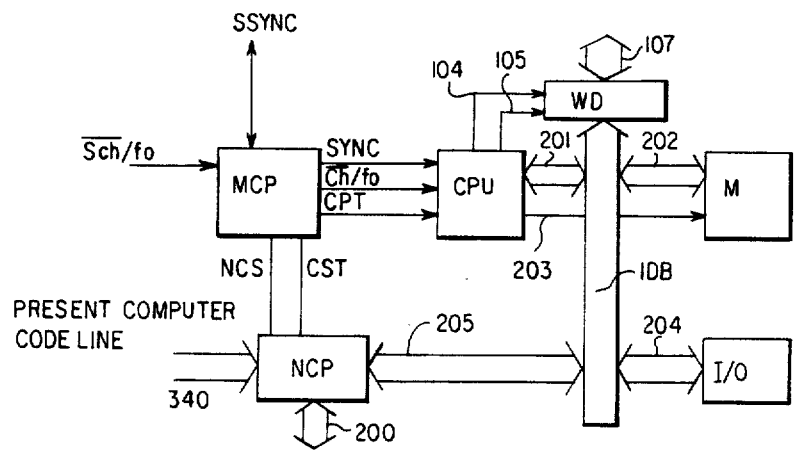
FIG. 2B is a schematic diagram of a cell-computer according to this invention.

FIG. 2B is a schematic diagram of a cell computer according to this invention. In FIG. 2B, a $\overline{Sch}$/fo signal is generated externally by computer user applied to each MCD to designate the chief computer and follow computers. When cooperative operation of the multi-computer is asked, the NCD of the follow-computer gets an encoding signal through encoding bus 200. After reception of the signal, each of the follow computers outputs a synchronous NCS signal to the MCD. The NCD in the chief computer then sends out a cooperation start-enable (hereafter in brief CST) signal, for starting cell-computers to operate cooperatively. After their receiving this signal, the MCD sends a pulse of fixed width to the system synchronous line (hereafter in brief, SSYNC line). Once the chief computer and all follow computers selected by NCS signal have received this pulse from the SSYNC line, their MCDs send to CPU a synchronous pulse SYNC, a status indicating signal and a status signal indicating if the CPU has entered the status of CECO-instr. operation (hereafter in brief, CPT signal). When the SSYNC signal is received by the CPU, the CPU is not in standby until the current instruction being executed at this time of the SYNC signal's arriving is finished. At the trailing edge of the SYNC pulse, the cell-computers of the CECOPUTER system enter synchronization and start to execute the CECO-instr. The CECO-instr. contains a number of CECO-MC. In each CECO-MC the matching and coordination of the cell-computers are ensured by four CECO-machine-cycle-function-factor (hereafter in brief, CECO-MC-factor) signals generated by their own CPU. Since the bytes addressed by PC of the chief computer (hereafter in brief, PC-addressing) are shared by all the cell-computers under the rule of CECO-instr, the synchronization of CECO-instr. is realized. The CECO-MC-factor signals are generated by CPUs, in which the signals on lines 104 nand 105 are used to control the window device WD and to determine the enable/disable and the direction of the WD. By these two signals the data transferring among cell-computers is completed. Another two signals of CECO-MC-factor signals are used to valid/escape the CPU and memory of the cell-computer so as to write/read to/from IDB. AS the effect of the CECO-MC-factor signals, modifications of write/read are made in the internal of the cell computers and the management of the CECO-data bus is completed by controlled windows, such that three essential elements for byte transferring in a multi-computer system, source, path and destination are formed. Further byte transferring within a MC can be performed.

Figure 3A:
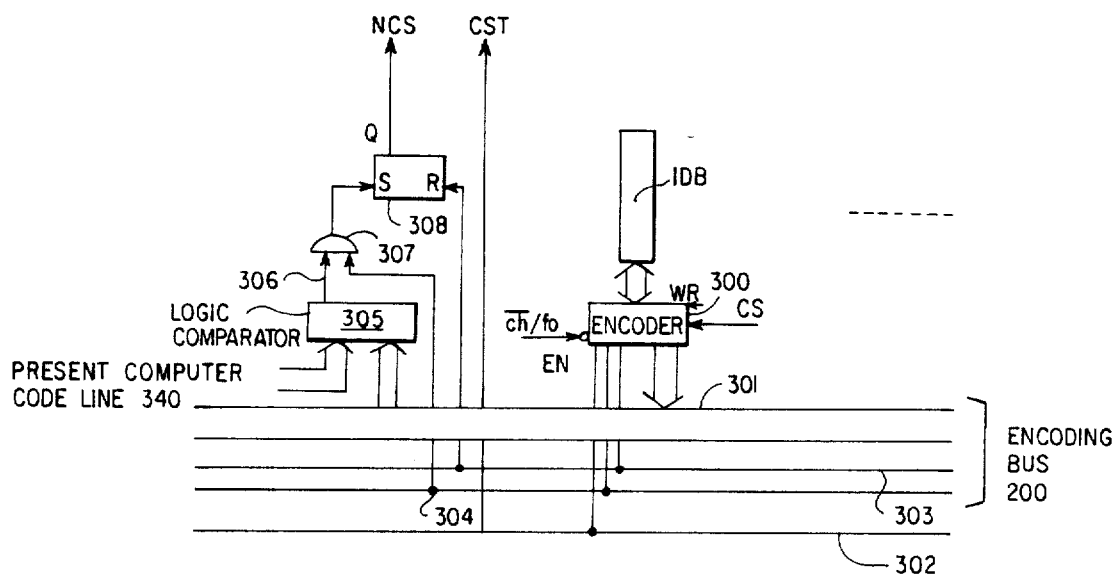
FIG. 3A is a schematic diagram of an embodiment of NCD device in the cell-computer shown in FIG. 2B.

FIG. 3A is the schematic diagram of an embodiment of an NCD device in the cell computer shown in FIG.

2B wherein encoder 300 is an I/O device of the computer. As a chief computer, its encoder 30 is enabled by signal $\overline{ch}/fo=0$, and sends codes to encoding bus 200 connected to the follow computers. A $\overline{ch}/fo=1$ signal applied to the follow computers disables their encoders 300 to present a high impedance state to encoding bus 200 that may be expanded. In which, 301 is an encoding addressing bus, and 302 is a cooperation start-enable line for transferring CST signals. Signals over line 303 are used to reset the strobing register. 304 is a strobing signal line. Logic comparator 35 compares the codes from 340 of the present computer with the codes from encoding addressing bus 301. If they are the same, a high output generated by comparator 305 is sent to AND gate 307 via 306, and when the strobing signal from line 304 is high level, 307 sends a signal to register 308, setting it as "high" level. The output signal NCS of the register 308 and the signal CST from 302 are sent to the MCD. When cell computers taking part in cooperation need to be reconfigured or rearranged, a positive pulse sent by 303 resets registers 308 of all cell computers such that the NCS signal is "low" level.

It is necessary to call to attention that the NCD may have various forms, even being deleted, depending on the different architectures of the CECOPUTER system and the technology employed.

Figure 3B:
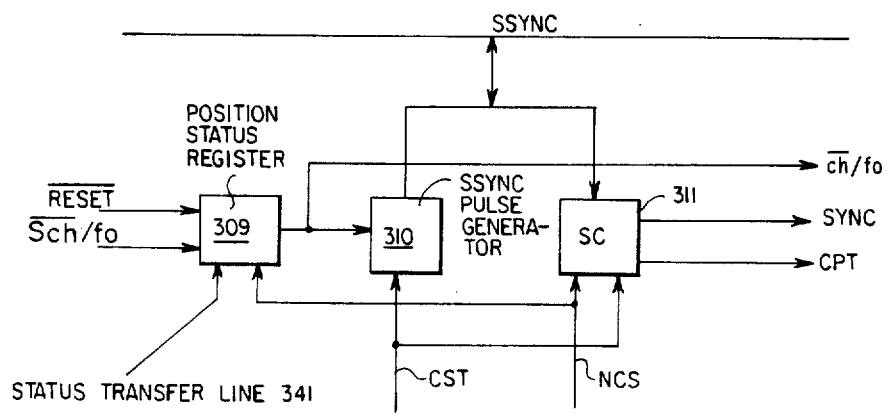
FIG. 3B is a block diagram of an embodiment of MCD device in the cell-computer shown in FIG. 2B.

FIG. 3B is a block diagram of an embodiment of MCD in the cell computer shown in FIG. 2B. Various inputs, including the Reset for CPU, status transferring signal from a status transfer line 341, NCS signal from the NCD and the signal $\overline{Sch}/fo$, determine the output of status register 309 and status of the cell-computer in the CECOPUTER system, i.e, the computer functions either as a chief computer or as a follow computer. Then status register 309 outputs a signal $\overline{ch}/fo$ to CPU and SSYNC pulse generator 310. When the present computer is defined as a chief computer, having accepted output signal $\overline{ch}/fo=0$ from status register 309 and the $CST=1$ signal from the NCD, 310 sends a SSYNC pulse signal with a definite width to not only SC device 311 of the chief computer itself, but also SC devices of all the follow computers via SSYNC line. When the present computer is defined as a follow computer, the SSYNC pulse generator 310 has no output, the SC device 311 receives the signal from the SSYNC line. After reception of the SSYNC signal from the SSYNC LINE, NCS signal and the CST signal from the NCD SC device 311 sends a SYNC signal and a CPT signal to the CPU of the present computer.

Figure 3C:
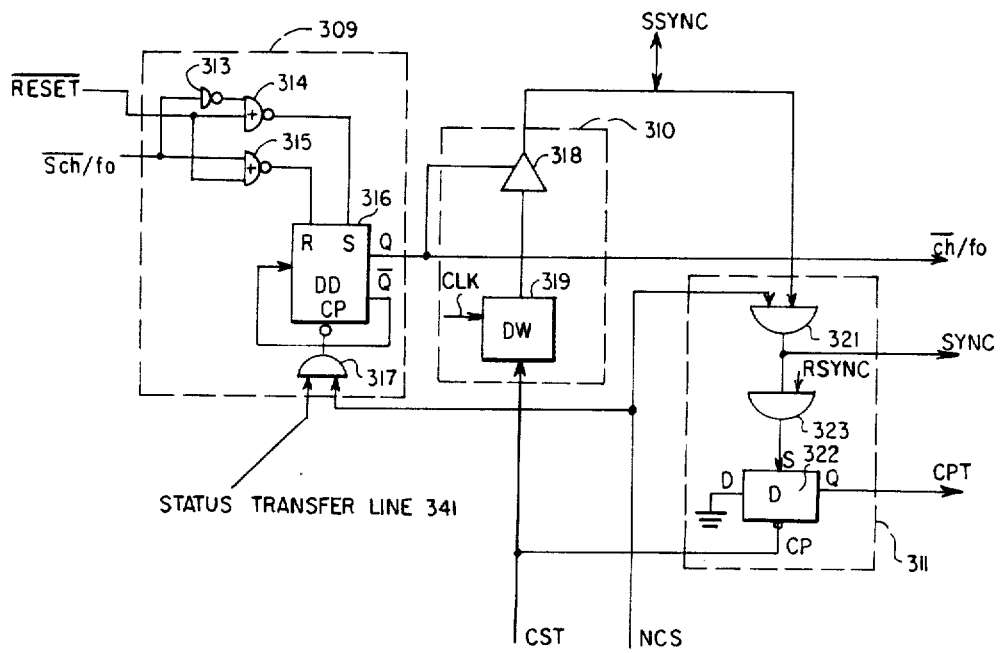
FIG. 3C is the circuit diagram of an embodiment of the MCD device in the cell-computer shown in FIG. 3B.

FIG. 3C is a circuit diagram of an embodiment of the MCD device in the cell computer shown in FIG. 3B wherein status register 309 consists of NOT gate 313, NOR gates 314 and 315, D flip-flop 316, and AND gate 317. The SSYNC pulse generator 310 consists of tri-state inhibitor 318 and monostable 319. SC device 311 consists of AND gate 321, D flip-flop 322 and AND gate 323. The principle of their operation is described as follows. When power is applied to the CECOPUTER system D flip-flop 316 is set by the signals $\overline{Reset}=0$ and $\overline{Sch}/fo$ via NOT gate 313, and NOR gates 314 and 315. If a status transferring signal from status transferring line 341 (this signal may be produced by hardware, or by a trigger signal activated by the instruction software) is ANDed with NCS signal from NCD at AND gate 317 to generate a signal for triggering the CP input of D flip-flop 316 so that Q-output of 316 is inversed. If the present computer is defined as a chief computer, the Q-output of 316 is at "0" level. When the computer is defined as the follow computer, the Q-output is at 37 1" level. Therefore only when the computer is defined as the chief computer can the tristate inhibitor 318 feed the SSYNC pulse signal generated by the monostable 319 to the SSYNC line. When the computer is defined as the follow computer, the tri-state inhibitor 318 is inhibited since the Q-output of 316 is at "1" level; AND gate 31 can only receive the SSYBC pulse signal from the SSYNC line. The NCS signal from the NCD device and the SSYNC pulse signal are ANDed at AND gate 321, and as the result, 321 outputs a synchronous signal SYNC applied to the CPU and AND gate 323. This SYNC signal and RSYNC signal from the CPU are ANDed at AND gate 323 (RSYNC signal may be different for different types of CPU. However, it must be a signal responsive to the SYNC and generated at the beginning of the next instruction after the CPU executes the instruction being executed at this time of the SYNC signals's arriving) to generate a signal to the Set end of D flip-flop 322. At the beginning of the next instruction of the present CPU, the signal from the Q-output of 322 is sent to the CPU of the present computer as the CPT signal. When the CST signal is over, its trailing edge triggers the CP input of 322, for setting the ground level of D-input to eliminate the CPT signal. In some other design, it is easy that the CPT signal could also be generated by the trailing edge of the SYNC signal.

Figure 3D:
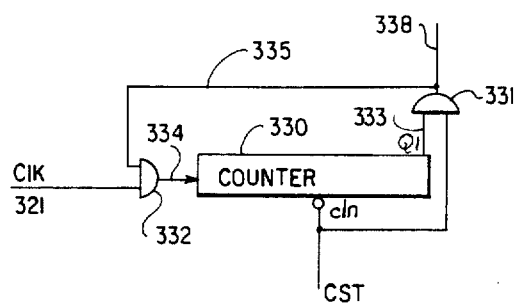
FIG. 3D is an embodiment of the monostable device DW shown in FIG. 3C.

FIG. 3D is an embodiment of the monostable device DW shown in FIG. 3C. When the CST signal is at zero level, counter 330 is forced to reset. When CST is at high level, it ANDs with the output signal $\overline{Qi}$ from the counter at AND gate 331. As a result, high level of the output from 331 makes the clock signal CLK enter the counting input of counter 330 via AND gate 332 and output 338 from gate 331 is not "0" level until the $\overline{Qi}$ end of counter 330 is "0" level. When the counter is full, $\overline{Qi}=0$ and the counter stops counting until the CST is over ("0" level), the counter is forced to reset again and is returned to the initial state. The capacity of the counter determines the width of the pulse from AND gate 331 which is asked as greater than the time duration of any piece of possible instruction so as to ensure that within the SSYNC pulse width all the cell computers selected can finish instructions that are being executed by their CPUs and enter the standby state.

Figure 3E:
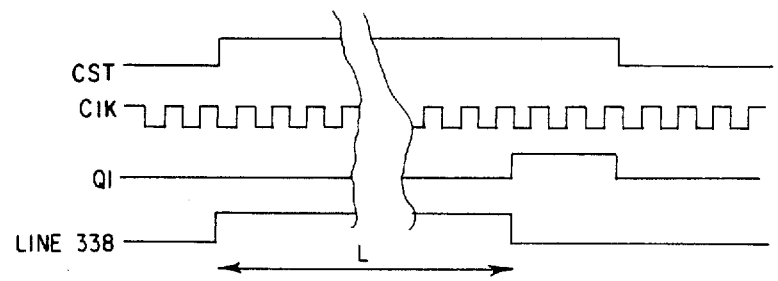
FIG. 3E is a waveform in circuit of FIG. 3D.

FIG. 3E is a waveform in the circuit of FIG. 3D. The pulse width L depends on output Qi from counter 330.

Figure 4A:
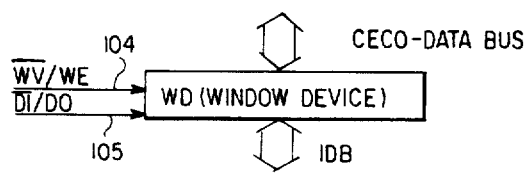
FIG. 4A is a block diagram of the WD in the cell-computer according to this invention.

FIG. 4A is a block diagram of the window device in a cell computer according to this invention. The WD is connected between the IDB and the CECO-data bus. WD may be constructed by a bi-directional tri-state transceiver or other types of configurations according to different applications.

Two CECO-MC-factor signals on control lines 104 and 105 from the CPU enable the WD and control the direction of data transferring. Obviously, these two signals may be modified to other types, e.g. the enable control type in which each control signal can enable in one direction. Any operation of the WD can be performed in a MC of the instruction.

Figure 4B:
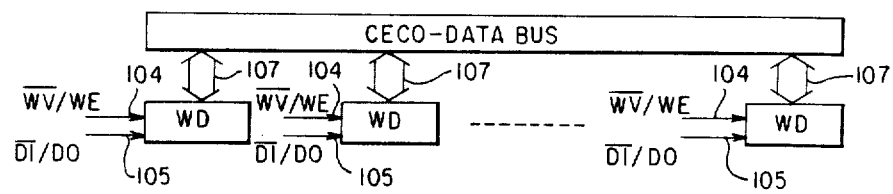
FIG. 4B is an illustration of transferring data in a MC via the window devices of cell-computers and CECO data has according to this invention.

FIG. 4B is an illustration of transferring data in a MC via the WDs of cell computers and CECO-data bus according to this invention. In the cell computers which are executing the CECO-instr., only the WD of one cell-computers can be under the status of (WV, DO), (that is, only the data from its IDB can be sent to the CECO-bus via the WD), while the WDs of remaining computers can only be under the status of (WV,DI)

(that is, data from the CECO-bus is sent to the IDBs via the WDs). In addition, the possible status (WE) of the WD indicates that in this MC this WD presents a high impedance state. As an alternative structure of the WD, corresponding modification of the CECO-data bus should be made to perform the above mentioned control to WD, as will be further illustrated later. As seen from the above description, the communication of the multi-computer system is performed by two related portions. The first one consists of the window devices and the CECO-data bus, which coordinates the operation among the cell computers in the CECOPUTER system by controlling window devices. The second one consists of the bus-master device CPU, the bus-slave devices, the window device and the IDB, inside the cell computer. The access operation to the IDB by the devices inside the computer is adjusted by the CECO-MC-factor signals generated by the CPUs of the cell computers, as shown in FIG. 4C.

FIG. 4C is a schematic diagram of the structural relation among the CPU, memory M (or I/O), the window device and the IDB in the cell computer according to this invention. The window device, bus-master device CPU and various bus-slave devices (e.g. the memory M) which operate on the MC level can transfer data to/from the IDB and operate on the MC level. The distinction between the WD and the bus-slave devices is that the WD has no address lines but is directly controlled by the CECO-MC-factor signals generated by the CPU. It means that the window device is the third type of device on the IDB in addition to the bus-master device and the bus-slave devices. While the cell computer is in read/write MC, if CECO-MC-factor signals for the WD are (WV, DO), then the data is transferred from the IDB to the CECO-data bus via the window device. If the WD is in the status of (WV, DI), signals (CE, ME) must be used to shield and adjust the source devices which should have sent data to the IDB in order to prevent the contention on the IDB. In the meantime these control signals can also be used to design the function of the CECO-instr.

FIG. 4D is a circuit diagram of an embodiment of the synchronous parallel window device (8-bit) shown in FIG. 4A and composed of usually tri-state transceivers. Lines 450 and 451 control both the direction of data transferring and the enable time of the WD. The decoder 452 receives the signals $\overline{WV}$/WE and $\overline{DI}$/DO from the CPU and generates outputs (WV*DO) 450 or (WV*DI) 451. When signal WE is active (i.e. WD device presents a high impedance state), the IDB and CECO-data bus are isolated from each other.

FIG. 5A and FIG. 5B show how in the cell computers the CPU enters a standby state under control of the SYNC signal. Two types of standby and several ways of connection are illustrated. However, no matter whether the CPU's interruption is used, all CPU's interruption of the chief-computer and the follow-computers must in fact be inhibited from the beginning of the SYNC signal until the completion of the CECO-instr. Otherwise the execution of the CECO-instr. may be destroyed by the interruption occurred.

FIG. 5A shows a timing diagram and a schematic diagram of a device with an embodiment synchronizing the cell computers in the CECOPUTER system according to this invention. This device uses the WAIT or READY signals of conventional CPU and the waiting clock cycle Tw in the MC. When the SYNC signal is at the high level and only at the occurance of the first MC M1 of next instruction, AND gate 501 outputs a waiting signal 502 that makes the processing stay at Tw between T2 and T3 in M1. Though the different computers enter their Tw states at different time instants, all of them may enter standby in the period of signal SYNC=1 since the width of the SYNC pulse is enough. Once the SYNC signal turns to "0" level, the computers enter the state of T3 at the same moment. The timing diagram in FIG. 5A indicates how, during the high level period of the SYNC signal, the chief computer and follow computers enter their standby status at their clock cycle T2 of M1. Whereas during the SYNC signal's turning to low level, the chief computer and follow computers enter synchronization at the clock cycle T3 of M1.

FIG. 5B shows another timing diagram and schematic diagram of a device as an embodiment synchronizing the cell computers in the CECOPUTER system according to this invention. CPUs of the cell computers are asked to set up a new standby status that can stay at T1 of the first MC of the next instruction and corresponds to a HALT query made by a CPU between instructions instead of between the MCs. The waveforms are shown as FIG. 5B. The other characteristics are the same as those in the method shown in FIG. 5A.

The trailing edge of the signal SYNC can also be used, instead of the signal RSYNC of FIG. 3C, to set the CPT output of flip-flop 322.

Figure 6A:
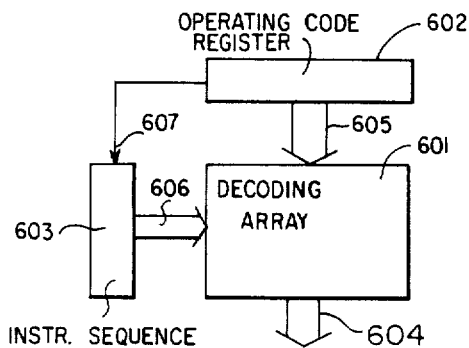
FIG. 6A is a schematic diagram of a decoding device in the CPU of a conventional computer.

FIG. 6A is a schematic diagram of a decoding device in the CPU of conventional computers. It is not unique and complete because only those parts which are helpful in describing this invention are shown in this figure. It consists of operating code register 602, instruction sequence 603 lines 605 and 606 transferring related information to decoding array 601. By 604, decoding array 601 outputs related signals pertaining to the MC type (e.g. read/write MC) in the instruction. This schematic diagram is also suitable to the computer structure of instruction pre-fetching in which the execution of instructions is sequential and the instruction code can be pre-fetched.

During the execution of each MC, the source device, destination device and the type of MC should be defined by the CPU for the data transferring process. Of course, all of these could also be realized by combinational logic or others, also included in this invention.

Figure 6B:
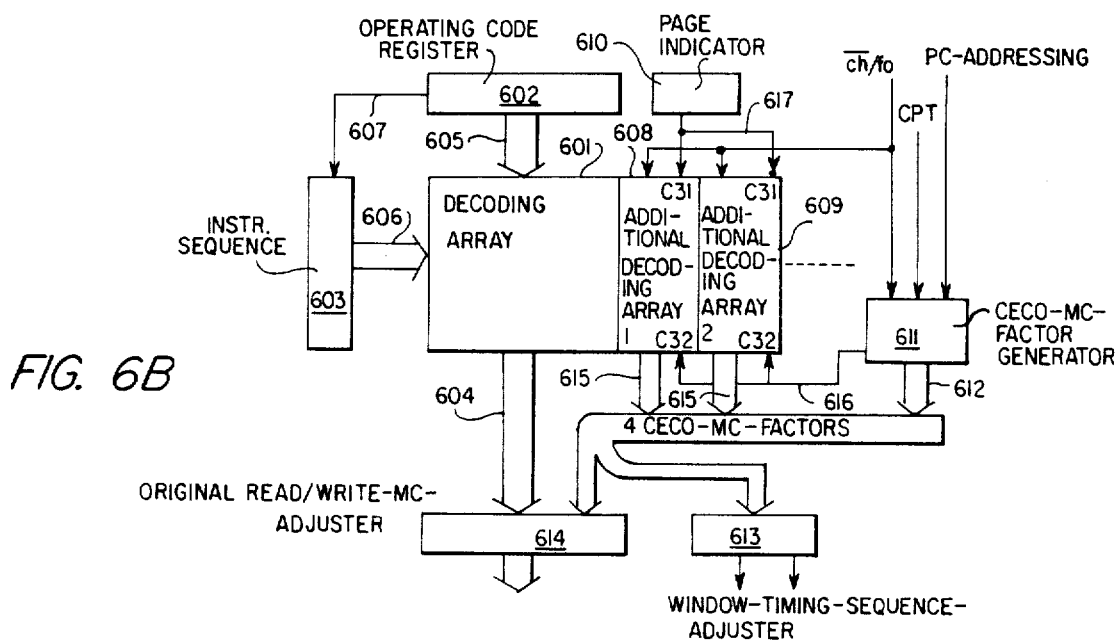
FIG. 6B is a block diagram of the decoding device in the CPU of the cell computer according to this invention.

FIG. 6B is a block diagram of the decoding device in the CPU of the cell computer according to this invention. In addition to conventional decoding array 601 in FIG. 6A, several additional decoding arrays are added (e.g. 608, 609).

The combination of each additional decoding array and array 601 is named as a CECO-instr. set page. The additional decoding array may be constructed with ROM or RAM programmed by the user. In the case where all additional decoding arrays are not selected, the page 0 that is actually the instruction set of the conventional computer is formed, and the computer can operate independently as a conventional computer. When the computer is as a cooperative cell computer in the CECOPUTER system, the page indicator 610 defined by software selects one of the CECO-instr. set pages. In each CECO-instr., depending on the given instruction (operating codes) and the MC order, a set of CECO-MC-factor signals is generated by the additional decoding arrays. However, only during non-PC-addressing MC can the signal generated by the CECO-MC-factor generator 611 enable one of the additional decoding arrays via line 616 to output a set of CECO- MC-factor signals in the bus 615. In the case of PC-addressing MC, c̄h̄/fo, CPT and "PC=1", the CECO-MC-factor generator 611 generates a set of special CECO-MC-factor signals to bus 615.

The control functions of each pair of CECO-MC-factor signals are listed as follows:

$\overline{CV}$/CE: valid/Escape the read/write operation of the IDB to the CPU $\overline{MV}$/ME: valid/Escape the read/write operation of the IDB to bus-slave devices such as memory.

$\overline{WV}$/WE: enable/disable the window device.

$\overline{DI}$/DO: data is transferred into the IDB via WD/data is outputted to CECO-data bus via WD.

Whereas the first and second pairs of signals are used to adjust the read/write MC of the conventional computer and perform the necessary escaping control, the third and fourth pairs of signals are used to manage the WD. On the basis of signals of read/write MC of the conventional computer, the outputs of device 614 are adjusted by the signals ($\overline{CV}$/CE, $\overline{MV}$/ME). If they are (CV, MV), no adjustment is made and the MC of the conventional computer is kept. When ME is requested, the read/write operation of bus-slave devices (such as the memory) to the IDB can be escaped by various methods, e.g. deleting the read/write signals of CPU, or disabling the chip select of the memory chips. When CE function is requested, the read/write operation of the registers inside the CPU should escape. After receiving the ($\overline{WV}$/WE, $\overline{DI}$/DO) signals, window-timing-sequence-adjuster 613 adjusts them to prevent the possible overlapping of two neighbouring MCs which will lead to contention on the IDB or CECO-data bus and damage to the computer. The method of adjusting is to shorten the time width of the WV signal. By this manner, four CECO-MC-factor signals control respectively the read/write operation of the IDB to both the CPU and bus-slave devices (such as memory) and the status of the WD. When a cell computer operates independently, the CECO-MC-factor signals generated by CECO-MC-factor generator 611 are constant as (CV, MV, WE). It indicates that the CECO-instr. of a cell computer according to this invention can entirely be compatible with the instruction of conventional computers.

Figure 6C:
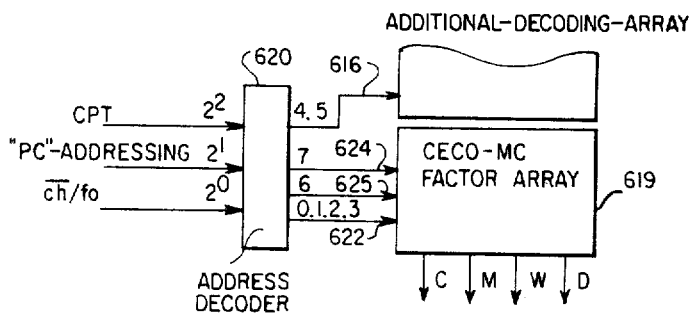
FIG. 6C is a schematic block diagram of an embodiment of a CECO-MC-factor generator according to this invention.

FIG. 6C is a schematic diagram of an embodiment of a CECO-MC-factor generator according to this invention. Having received the "PC"-addressing signal, CPT and c̄h̄/fo signal, address decoder 620 generates outputs to CECO-MC-factor-array 619 via lines 622, 623 and 624 and the additional decoding arrays via line 616 respectively. During CPT=0, the output 622 of address decoder 620 is active and controls 619 to generate a set of special CECO-MC-factor signals enabling the cell computers to operate independently.

During the PC-addressing MCs, in CPT=1, one of the two outputs 623, 624 of address decoder 620 which is valid is based on signal c̄h̄/fo so that the chief computer and the follow computers can generate a set of different special CECO-MC-factor signals respectively. During non-PC-addressing MCs in CPT=1, the output on line 616 of address decoder 620 is valid. Signals on 616, along with the page indicator, operating code and its MC order of instruction (shown in FIG. 6B), are sent to the additional decoding array to generate CECO-MC-factor signals. It is noteworthy that CECO-MC-factor array 619 and the additional decoding array may be constructed as one structure or all functions may be realized by combinational logic. In addition, under PC-addressing MC and CPT=1, the special CECO-MC-factor signals may be obtained directly from the additional decoding array by decoding the operating codes and MC order of instruction without the CECO-MC-factor-generator. Of course the latter will make the additional decoding array bulky.

Figures 6D, 6E:
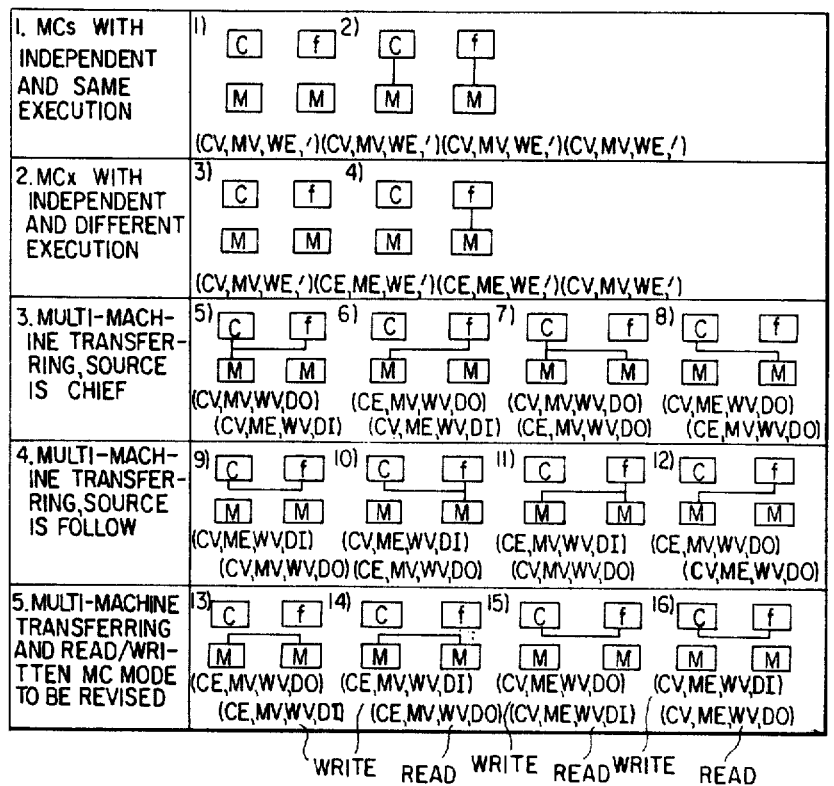
FIG. 6D shows the available CECO-MC-factor signals generated by the CECO-MC-factor generator under various conditions according to this invention.
FIG. 6E shows multi-computer function modes between a chief computer and follow computers during those MCs of CECO-instr. in which the address bus is not addressed by a program-counter register (hereafter in brief, NON-PC-addressing MC) according to this invention.

FIG. 6D shows the available CECO-MC-factor signals generated by the CECO-MC-factor generator under various conditions according to this invention. When CPT=0, the CECO-MC-factors generated by CECO-MC-factor generator 611 are (CV, MV, WE, /) that shows cell computers under independent operation. When CPT=1, if the cooperating cell computers are in PC-addressing MC e.g. PC=1, the CECO-MC-factor signals generated by the chief computer's CECO-MC-factor generator are constant as (CV, MV, WV, DO), while in the follow computer, the CECO-MC-factor signals generated by their CECO-MC-factor generators are constant as (CV, ME, WV, DI). Then the bytes addressed by PC of the chief computer are shared by all of the follow computers. Since the operating codes received by all cell-computers are the same, the synchronization of all cell computers is kept during the execution of this CECO-instr. This method of keeping synchronization of computers by means of the same instruction codes causes a limitation for use of those instructions with different executing times in the instruction set of the conventional computer. If the cooperating cell computers in the CECOPUTER system are in the NON-PC-addressing MC (PC=0), then the CECO-MC-factor signals that are defined by the CECO-instr. are generated by the additional decoding arrays shown in FIG. 6B. Because the operating code space of the instruction set in the conventional computer may not be modified during generation of the CECO-instr. set according to this invention, programs of the cell computer according to this invention can be compatible on the machine code level, with that of the conventional computer. On the other hand, according to this invention, the status of the instr. set pages determines whether a cell computer is a conventional computer under execution of an individual computer's instructions or a cell computer under execution of the CECO instructions. Therefore, a cell computer according to this invention can either be used as an individual computer or can operate cooperatively with other computers in the CECOPUTER system to execute the CECO-instr. It is noteworthy that there is a possibility that a few new instructions may enter into the space of operating codes operating codes of the conventional computer and occupy some operating code space. The operating code space is the most flexible to be expanded according to the needs of CECO-instr. In addition, for the purpose of improving capability, the function of MC of the conventional computer may be redefined, or the number of MCs may be modified. For example, for the purpose of DMA speed, the read/write signal of some MCs have to be modified in 601–607 (see FIG. 6B). Of course, if needed, the whole instruction set may be redesigned.

FIG. 6E shows the multi-computer function modes between the chief computer and follow computers during the MC of non-PC-addressing in the CECO-instr. according to this invention. These are also the operating modes possibly appearing in the multi-computers controlled by the CECO-MC-factor signals. This case may be explained simply by an example of one chief computer and one follow computer. Wherein, C is the CPU of chief computer, F is the CPU of follow computer, and M is the memory. Other devices are deleted here for simplicity in description. In CPT=1 and non-PC-addressing MC, sixteen functions pertaining to five types may possible occur. The CECO-MC-factor signals are listed for each function and are generated in the additional decoding arrays of the CPU. When the chief computer transfers data to follow computers, broadcasting function is realized. However during data transferring from the follow computer to the chief computer, only one follow computer may transmit data to the chief computer. Twelve functions of the first four types shown in FIG. 6E may be realized only by way of escaping signals (CE, ME, WE) without change of the read/write MC type of CPU of the conventional computer. But for the four functions of the fifth type, revision of the read/write is required on the basis of the ch/fo signal. As described above, if the additional-decoding array page is programmable by the user. The CECO-instr. may be composed according to user's requirements and a special CECO-instr. set may be formed in page form. This method of composing CECO-instr. is quite flexible and has the advantage of adequate surplus.

FIG. 6F is an illustration showing the design of a CECO-instr. and its execution in the CECOPUTER system according to this invention, wherein the function of the instruction "Load (HL), n" is defined as the number n being sent to the memory addressed by (HL) of all the follow computers only. In the three MCs, M₁ is to read operating code. M₁ and M₂ are all the PC-addressing MCs. M3 executes the multi-computer functions defined by the CECO-instr.

FIG. 6G shows the procedure wherein a data block in the chief computer is transferred to a designated area of a follow computer in the CECOPUTER system under CECO-instrs. of execution according to this invention. If this program runs on an individual computer, the function of this program in Z80 is to move the data block with length B3 B2 from an area with first address B3'B2' to an area with the first address B3''B2''. However, in the case of CECO-instr., because the "bytes of PC-addressing" in the chief computer are shared and the non-PC-addressing MC of LD A, (HL); LD (DE), A is defined by CECO-instr. This program functions to move the contents of the memory area in the chief computer with first address B3'B2' and length B3B2 to the memory area in the follow computers with the first address B3''B2''.

The operating process is described as follows:

For 01–03 instructions, PC-addressing MC is employed for immediate data byte B2, B3. Therefore contents of the registers BC, DE, HL of the chief computer and follow computers are all set identically. For 04, 05 instructions two MCs of non-PC-addressing MC, A←(HL) and (DE)←A, have different definitions for the chief computer and follow computers.

During A (HL), in the chief computer, the CECO-MC-factors signals are (CV, MV, WV, DO), i.e.

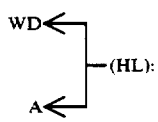

the follow computers are defined as (CV, ME, WV, DI), i.e. A←WD. As a result, the bytes addressed by (HL) in the chief computer are also sent to A registers of all follow computers. Although the addressing bus in the follow computers is still addressing, no data is sent to their IDBs from their memories. During (DE)←A, in the chief computer, the CECO-MC-factor signals are (CV, ME, WE, /), i.e. the idle execution of ←A; in the follow computers, the CECO-MC-factor signals are (CV, MV, WE, /), i.e. (DE)←A. The final result is that the contents of (DE) in the chief computer are kept, whereas contents from the chief computer are written in the follow computers. Thus, a byte's transferring from the chief computer to the follow computers is performed. Since the (BC) has been set, 06–09 instructions make the above mentioned 04, 05 instructions to be executed continuously until the block has been completely moved.

FIG. 7 shows the development of a cell computer based on a CPU of a conventional computer to obtain a cell computer according to this invention.

In FIG. 7, an instruction tracking device is used to track the timing in the CPU and makes it become synchronized. It consists of operating code latch 702 and MC order of instruction tracking 703. 702 is connected with the IDB and reads operating codes in the MC at the beginning of each instruction instructions. The timing tracking takes the MC as a unit and is controlled by the operating codes. 610 is a page indicator; 609 is additional decoding arrays; 611 is the CECO-MC-factor generator; 613 is the window-timing-sequence-adjuster. Except for the instruction tracking device, all other devices have the same functions and usage as those of FIG. 6B; however they may be simplified to some extent. There are only three CECO-MC-factor signals to be used except for $\overline{CV}$/CE. For the CPU of a conventional computer, it is almost impossible to realize the CE function in a MC cycle. Therefore in the CECO-MC, the cooperation of cell-computers is controlled by the above mentioned three CECO-MC-factor signals.

Since there are many types of CPU in the market, and their pin's signals, the types of buses and instruction systems are different. Therefore, for different types of CPU, different circuits of tracking and acquisition could be employed. It is thus obvious that variant modifications and changes can be made within the scope of this invention.

The operation process of FIG. 7 is described as follows. At the beginning of an instruction, CECO-MC-factor generators 611 of all the computers generate output signals. Then IDBs of all computers receive the same CECO instruction operating codes from the chief computer. All operating codes latches 702 of the tracking device read from their IDB and latch them. The instruction timing tracker 703 continuously indicates the current order of the MC of the instruction. The output of the tracking device is applied to additional decoding array 609 in the form of address. During the PC-addressing MCs of the CECO instruction, CECO-MC-factor generator 611 sends out the signal for matching the chief computer with follow computers. Then sharing the chief computer's CECO-instruction codes by all follow computers is realized. During the period of non-PC-addressing MCs, the output from the additional decoding arrays perform designed multi-computer function. In the actual structure, CECO-MC-factor generator 611 and additional decoding array 609 may be the same ROM structure.

Figure 8:
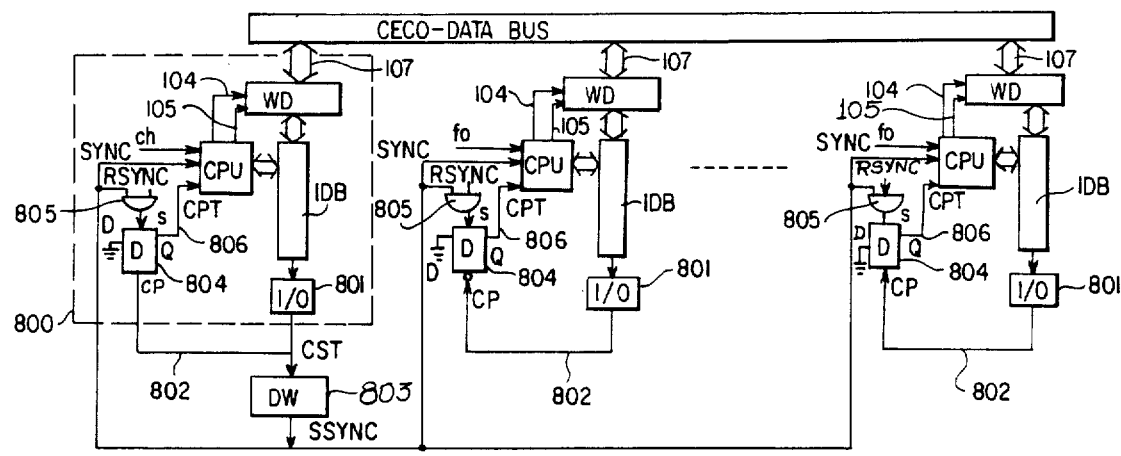
FIG. 8 is an embodiment of the CECOPUTER system according to this invention.

FIG. 8 is another embodiment of the system according to this invention. In this system, the chief computer and the follow computers are defined by the system. When the CECOPUTER system becomes under cooperation, all of the computers in the system, except the chief computer, are as follow computers. It can be seen from the figure that the NCD of the cell computer 800 is an I/O path. The MCD device has also been modified to a great extent. The operating principle is as follows: I/O device 801 of the chief computer generates a CST signal to trigger mono-stable DW 803 to send the pulse signal SSYNC with definite width. The SSYNC pulse signal is applied to the CPUs of all computers via the system synchronization line SSYNC. Having received the signal, all the computers then enter the standby status at the beginning of the next instruction. In addition, the SSYNC signal is also applied to the input of AND gate 805 of all computers and is ANDed with signal RSYNC at AND gate 805. Then AND gate 805 generates an output signal at the instant of T1 of first MC of the next instruction to make CPT signal generator 804 generate the CPT signal applied to the CPU via line 806. The CPT indicates that the CPU is entering the status of CECO-instr. Responding to the trailing edge of the CST signals generated by I/O devices 801, CPT signal generators 804 is reset to 0. Meanwhile, cell computers in the CECOPUTER system stop executing CECO-instruction and become under the status of individual computers. The other description of the operating principle and functions of other parts in this figure have already been described and hence will not be given again. As for conventional processors and software, in case fixing the chief computer and follow computers, the structure shown in FIG. 8 is simple and effective.

Figure 9:
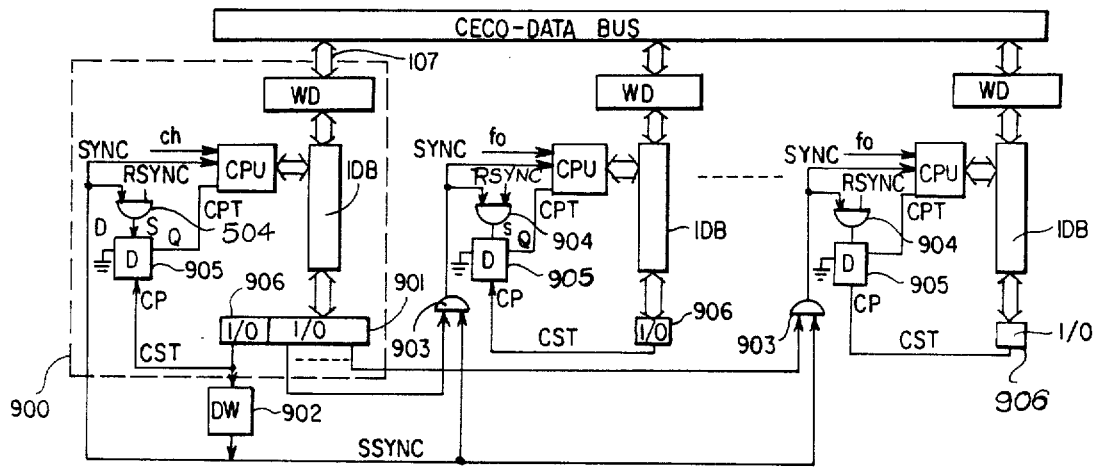
FIG. 9 is another embodiment of the CECOPUTER system according to this invention.

FIG. 9 is another embodiment of the CECOPUTER system according to this invention. In this system, the chief computer is fixed once designated, but the cooperating follow computers can be preselected dynamically with the aid of specific lines. Chief computer 900 has a hardware I/O port 901 that generates outputs to all computers. Each bit of the output is respectively sent to a follow computer. When cooperative execution of the CECO-instr. is required, I/O port 901 sends signals separately to AND gate 903 of all computers and I/O port 906 of the chief computer sends a signal to mono-stable DW 902. The CST pulse signal triggers mono-stable DW 902 to make it output a pulse signal to all computers via the system synchronization line SSYNC and this signal is respectively ANDed with the output signal of I/O port 901 of the chief computer at each AND gate 903. Therefore only the follow computers pre-selected by the chief computer are able to generate a SYNC signal at the output of AND gate 903 which is sent separately to the CPU and AND gate 904 for CPU to enter standby status, and an output from AND gate 904 at which SYNC is ANDed with RSYNC sets CPT signal generator 905 to high level. If this computer is not selected by I/O port 901 of the chief computer, this computer operates still independently as an individual computer. One of the distinctions among FIG. 8, FIG. 9 and FIG. 3A is that the signal CST, no longer with the bus, utilizes an output bit of I/O port 801 or 906 in each computer to reset CPT of each computer by the CECO-instr. It is not important whether or not the bus format of CST is used, the crisis is the function of both as the same and whether the bus can be used conveniently. From the description of FIG. 8 and FIG. 9, it is obvious that, adding a $\overline{c}$/fo status register in a cell computer can reset the chief computer in the CECOPUTER system.

Figure 10B:
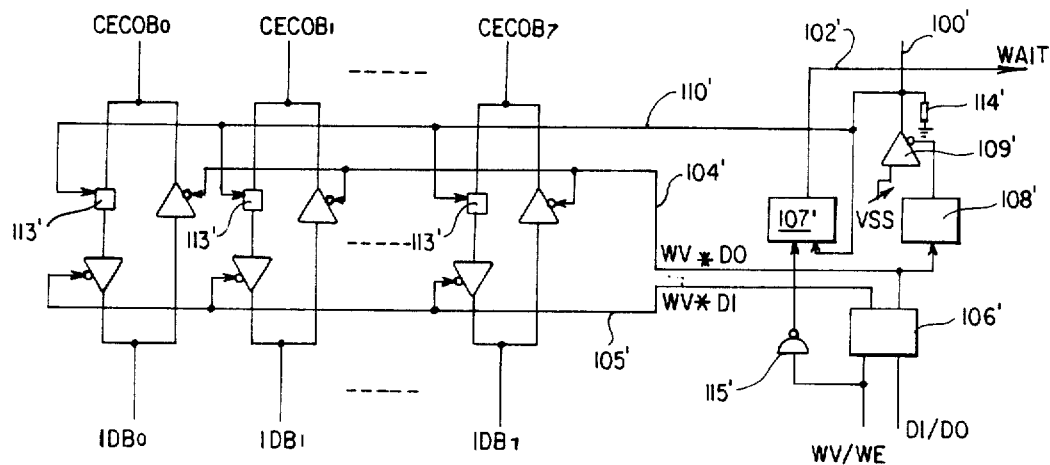
FIG. 10B is a circuit diagram of an embodiment of asynchronous parallel window device (8-bit).
Figure 10A:
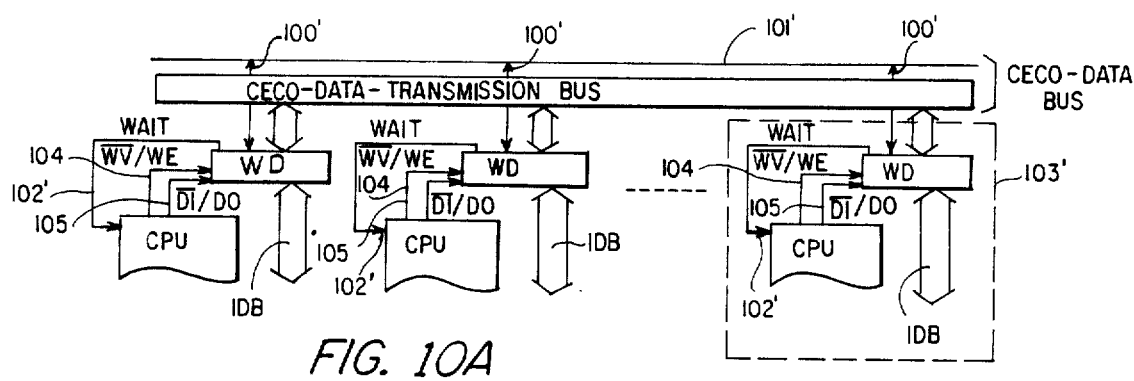
FIG. 10A is a block diagram of the CECOPUTER system under the mode of asynchronous parallel operation according to this invention.

FIG. 10A is a block diagram of the CECOPUTER system under the mode of asynchronous parallel operation according to this invention. In FIG. 10A, the cell computers under cooperation are kept in synchronization on the instruction level. However, the data transfer among the computers is carried out in the mode of the asynchronism and parallel wherein the WD is an asynchronous parallel window; 100' is the line for controlling data transferring rate and is connected with the transferring rate control bus 101'; 102' is the asynchronous waiting line. Only those parts which need to be described are shown in this figure. Structure and operating principles of other parts are the same as those parts in the above-mentioned mode and hence will not be repeated. The principle of operation is as follows. After the computers under cooperation are synchronized, if the CECO-MC-factor signals from the CPU via lines 104 and 105 are (WV, DO) (only one cell computer in the CECOPUTER system is allowed to be in this status), the window device (WD) outputs a pulse signal for data transferring rate which is sent to other cell computers 103' under cooperation via 100' and 101'. The window device has sent out a signal in advance to CPU via line 102' to make the CPU lie in the status of waiting clock cycle Tw by prolonging this MC. Meanwhile, data from the IDB is sent to the CECO-data-transmission-bus via the window device. When the CECO-MC-factor signals from the CPU via lines 104 and 105 are (WV, DI), the window device receives the data from the CECO-data-transmission-bus and stores it in the window's register (see FIG. 10B). The window device sends a signal via 102' to the CPU to make it under the waiting status of Tw of MC. The signals sent to the window devices by 101' via 100' can adjust the rate of the data transmission and identify the rate of the data transmission with that of the data reception.

When the pulse signal for asynchronous data transferring rate is ended, the computers under cooperation are triggered by the pulse signal's trailing edge and as a result, (1) the signals on the asynchronous waiting lines 102' of all computers disappear, wherein the MC withdraws from the waiting status and goes on to execution of its MC; (2) the contents transmitted on the CECO-data transmission-bus can be locked on the registers in the window device by this signal on line 101' so that the operations in remaining MC are transformed as the transactions between the window device and the IDB, and are isolated from the CECO-data bus.

FIG. 10B is a circuit diagram of an embodiment of an asynchronous parallel window device (8-bit). As compared with FIG. 4D, in the switching parts between two buses, a register 113' is added to lock the contents on the CECO-data-transmission-bus.

Decoding and delay device 106' receives the signals $\overline{WV}$/WE and $\overline{DI}$/DO from the CPU and sends the signals WV*DO or WV*DI to control this window device. The starting moment of signal WV*DO should be delayed a little as compared with that of signal WV (but they end at the same moment) to prevent neighbouring MC's from overlapping and the contention on the CECO-bus resulting from the phase difference among the multi-computers. The amount of delay should be determined according to the type of computer used. Device 107' could be a flip-flop device and is triggered by the leading edge of the output signal WV of inverter 115', generating a signal to make the CPU under the waiting clock cycle Tw. Device 107' is reset by the trailing edge of the signal from line 100', making CPU carry out remaining operations of the MC. Responding to the output signal WV*DO of decoding and delay device 106', a pulse signal to enable the tri-state gate 109' is generated by transmission-rate-pulse generator 108'. 109' then sends a positive pulse with equal width to line 100'. At the same time, the switching parts controlled by line 104' transfer the data from the IDB to the CECO-data-transmission-bus. Responding to the output signal WV*DI of 106', the output of 109' presents a high impedance state. Then the switching parts controlled by lines 105' and 110' transfer the data from the CECO-data transmission-bus to register 113' and then to the IDB.

Figure 10C:
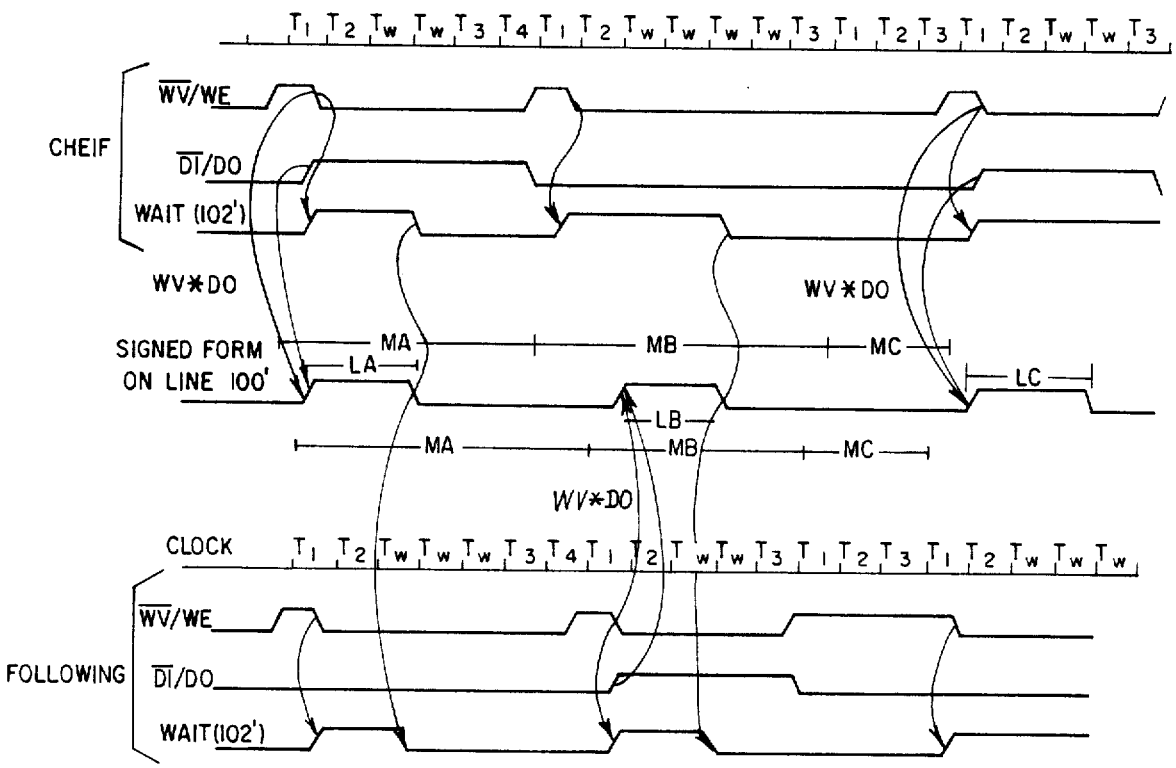
FIG. 10C is a timing diagram of the window device WD during transmission and reception in three successive MCs based FIG. 10A and FIG. 10B.

FIG. 10C is the timing diagram for the window device under transmission and reception in three MCs, based on FIG. 10A and FIG. 10B. During the $M_A$ machine cycle, the window device of the chief computer is controlled by signals (WV, DO) and the window devices of the follow computers are controlled by signals (WV, DI). The WV signals trigger device 107' to send a high level so that the CPU enters waiting state at this MC. At the same time, the WD of the chief computer controlled by the signals (WD, DO) sends via line 100' a data-transmitting-rate-pulse signal with width $L_A$ which is transferred via lines 101' and 100' to the window device of the follow computers. During this period, data from the chief computer is sent to the follow computers via the CECO-data-transmission bus by means of the window devices of the chief computer and the follow computers. Responding to the trailing edge of the signal $L_A$, the window devices of the chief computer and follow computers send low level signals respectively on the line 102'. Then all the CPUs stop waiting, and turn to execution of their MC. During the machine cycle $M_B$, the window devices of the follow computers are controlled by signals (WV, DO) and the window device of the chief computer is controlled by the signals (WV, DI), thus at the time of starting moment of the signal WV, the cell computers in the CECOPUTER system go into the waiting state Tw. However, a signal with width $L_B$ for data transmission rate is sent out from the WD of the follow computer via line 100' and received by the WD of the chief computer via the line 101' and 100'. During the period of this signal, data is transferred from the WD of the follow computer to the WD of the chief computer via CECO-data-transmission-bus. Responding to the trailing edge of the signal on line 100' the signals on 102' of all computers are reset and all computers stop waiting. During the period of $M_A$ and $M_B$, it can be seen from FIG. 10C that the number of Tws of each computer may possibly be different and this invention does utilize it to control time difference of machine cycles between the chief computer and the follow computers and to limit the accumulation of phases. Mc is such a machine cycle in which all the computers are controlled by the signal (WE, /). Meanwhile the signal on line 102' is under the status of invalid, therefore all cell computers can perform their own MC independently. However, asynchronous difference may be accumulated by the way of operation that when this accumulation is long enough comparable to the length of MC the sychronization of the CECO-instr. may be lost. Hence the machine cycle Mc should be restricted in numbers. Since the Mc would appear only in the case of independent execution of non-PC-addressing MC, attention should be paid to the design of CECO-intr. to prevent the possibility of a number of sequential Mcs occurring in CECO-instr. It can be seen also in FIG. 10C that the $L_A$ and $L_B$ are generated by respective computers and their widths are adjusted by the data-transmission-time among cell computers. Furthermore $L_A$ and $L_B$ may have different width. The data-transmission-rate is usually a multiple of the clock and is determined by the transmission-rate on the CECO-bus. The width of $L_A$ and $L_B$ can also be set by external hardware method or set by software, using I/O instructions with an I/O port address established for the window device. These techniques are easy to understand for the technicians in the field of this invention and will not be described.

Figure 11A:
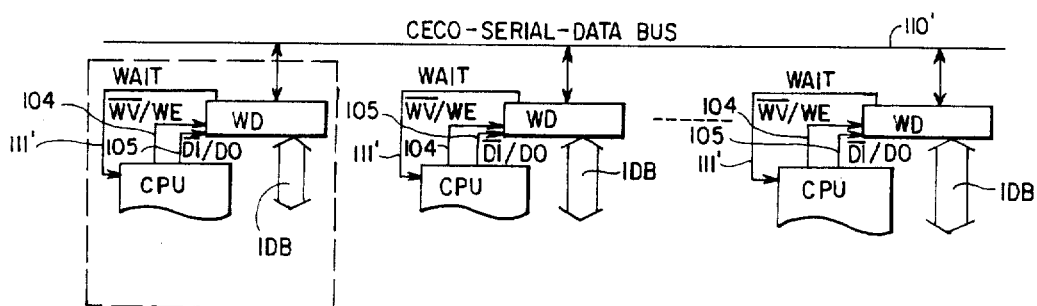
FIG. 11A is a block diagram of the CECOPUTER system under the mode of asynchronous serial operation according to this invention.

FIG. 11A is a structural block diagram of the system under the asynchronous serial operation mode according to this invention. In the FIG. 11A, all the cell computers under cooperation are synchronized on the instruction level, but the data, during the transmission among cell-computers, is transmitted in asynchronous serial mode. As shown in the diagram, the CECO-data bus becomes a wire 110'; line 111' is the serial-status-label line to transfer a signal that makes the CPU enter the waiting state Tw so that the parallel-to-serial conversion and serial-to-parallel conversion may be performed in each MC. The description of the structure of those parts relating to the CPU and their operating principle, as well as the operation of the program, have already been given and are not treated here again. Therefore the description is restricted only to those parts shown in the figure. After the cell computers under cooperation have become synchronized with the CECO-instr., if the CECO-MC-factor signals from the CPU via lines 104, 105 are (WV, DO) (only one cell computer in this system can be controlled by the signals then the window device controlled by signals WV*DO converts the data on the IDB into serial form within this period of MC and transfers it to CECO-data bus 110'. If the signals sent by the CPU are (WV, DI) (other cell computers could be controlled by the signals), then the window device controlled by signal WV*DI receives the serial data sent by CECO-data bus 110' and converts immediately the serial data into parallel data to transfer it to the IDB. Each window device, depending on the signal WV, keeps the CPU on the state of Tw clock cycle. After the serial signal is over, each WD sends out a signal releasing the Tw for each CPU to execute the remaining part of the MC continuously. In case of signal transferring delay (e.g. cover long distance) CECO-instruction can still keep in synchronization by means of the waiting method mentioned above. The serial data format, the data bits, start bit and stop bit, as well as the parity bit may also be added in the WD. The transmission rate is defined by hardware in this invention but can also be defined by software; various techniques may be used for it. The problem of asynchronism among computers as well as the transferring delay can be solved by the waiting state of CPU set by the serial window device and serial-label line 111'.

Figure 11C:
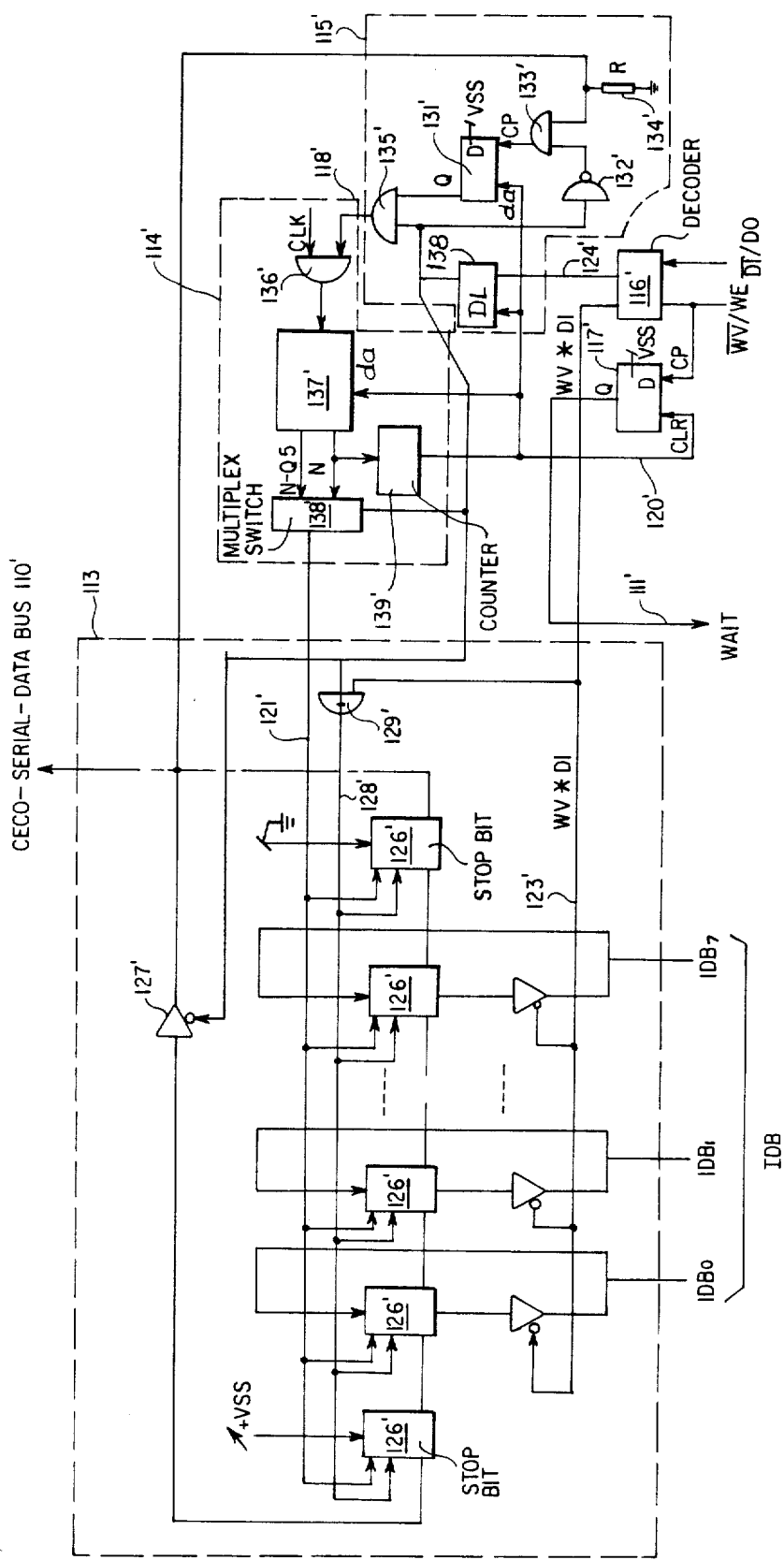
FIG. 11C is a circuit diagram of an 8-bit asynchronous serial window device.
Figure 11D:
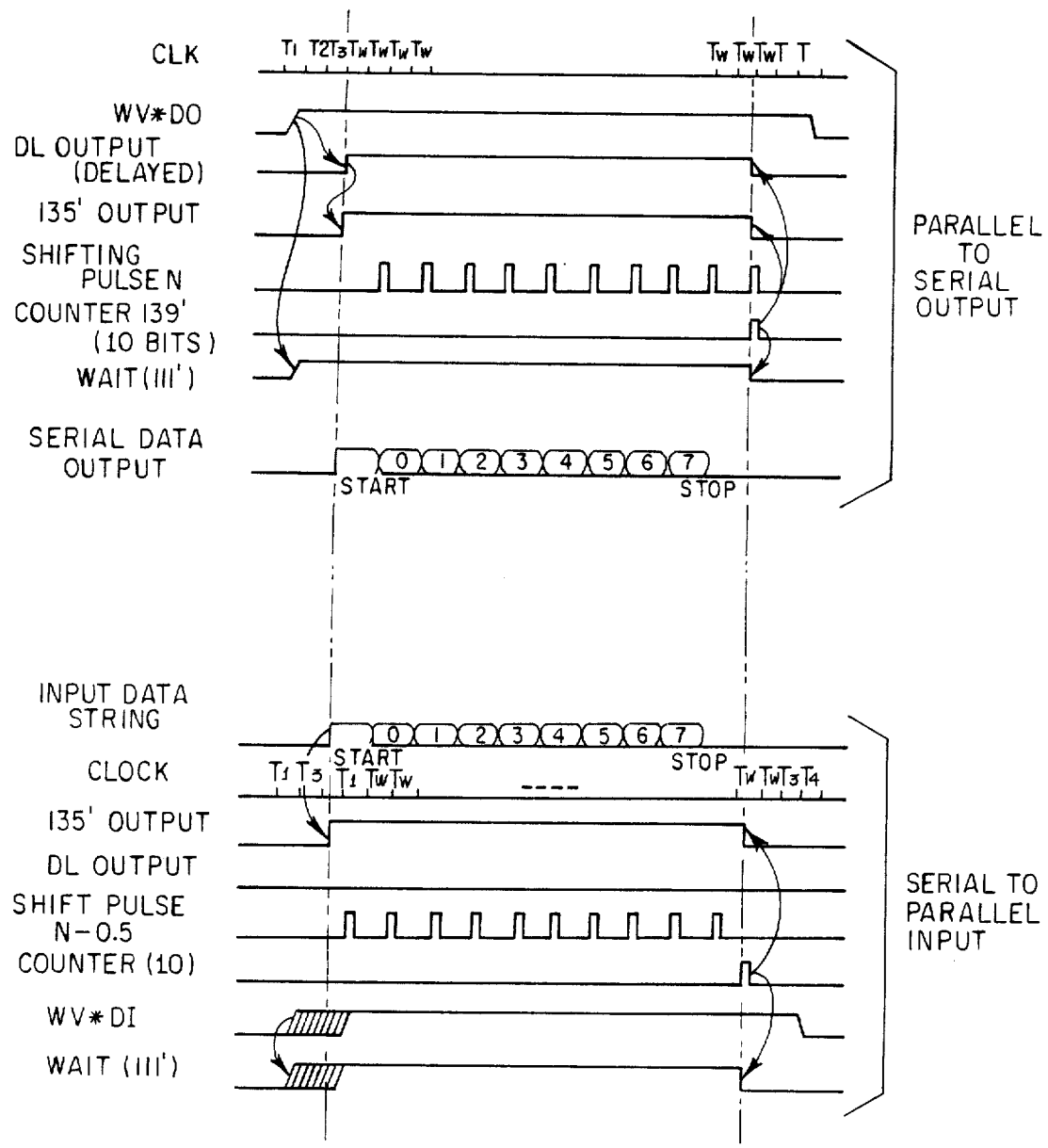
FIG. 11D is the waveform diagram of the asynchronous serial window device within the period of a MC.
Figure 11B:
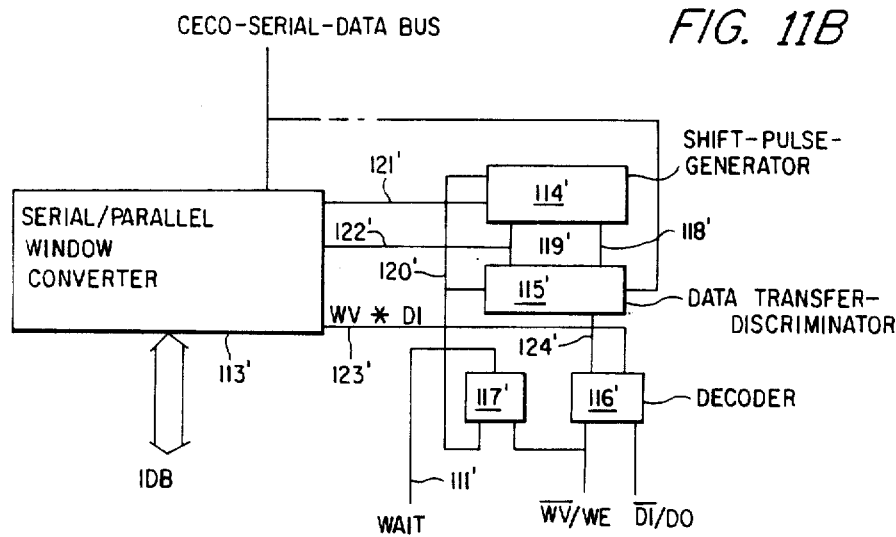
FIG. 11B is a circuit diagram of an embodiment of an asynchronous serial window device.

FIG. 11B is a circuit diagram of an embodiment of an asynchronous serial window device, wherein one terminal of serial/parallel window converter 113' is connected to the IDB and another one is connected to CECO-data bus 110'. 113' responds to the shift pulse signal from line 121', serial output signal from 122' and the parallel input signal WV*DI from 123'. Shift pulse signal 121' is used to control the serial to parallel conversion and parallel to serial conversion. The pulse frequency is the baud rate. Decoder 116' responds to the signals $\overline{WV}/WE$ or $\overline{DI}/DO$ from the CPU to generate signals WV*DO 124' or WV*DI 123'. Data-transfer-discriminator 115' responds to the signal WV*DO from 124' and the serial-reception-starting-bit signal from 110' to send an output signal to shift-pulse-generator 114' via 118'. This signal is maintained until a pulse appears at 120' which indicates that the serial shifting of a byte is over. Another output of 115' is respectively sent to shift-pulse-generator 114' via line 119' and parallel/serial-window-converter 113' via line 122'. Shift-pulse generator 114' is controlled by signals on line 118' to produce a series of pulses with pre-determined interval. Since the shift pulses under transmission or reception are different, the shift pulses sent to 113' via line 121' are determined by the signal at line 119'. After the number of bits of serial shifting are concluded, by line 120', shift pulse generator 114' generates an overflow pulse indicated by the end of the transmission of a byte, and it is sent to all the related parts to reset them at the end of every byte. The rate of the series of shift pulses on line 121' is the baud rate of serial transmission; its parameters, as those used currently in the design of related communication devices, may be designed as dynamically programmable. 117' is used to generate an active signal at the leading edge of the signal WV for the CPU to enter the Tw state. At the conclusion of serial transmission, this signal on line 118' is reset by the pulse on line 120' for the CPU to execute continuously the remaining part of this MC.

FIG. 11C is a circuit diagram of an 8-bit asynchronous serial window.

Responding to the signals from the CPU, decoder 116' sends out signals WV*DO 124' or WV*DI 123', both being low level under the effect of the signal WE. 117' is a D-flip-flop whose level of D-end is set into the output of Q end at the leading edge of the signal WV and it is reset by the pulse indicating the end of the byte from the line 120'.

DL 130' is a delay flip-flop whose output is delayed 0 to 3 Tc compared with the leading edge of signal WV*DO on line 124'. The delay is required for stabilizing the data before the data transferred to the shift-register from the IDB is locked. The DL generates a high level to line 119' and is also reset by the pulse on line 120'.

Device 131' is a D-flip-flop. When output of the DL is 0 level e.g., the output of gate 132' is at high level, the signal from serial CECO-data bus 110' is applied by gate 133' to the CP end of D flip-flop 131', so that in the case of serial reception the rising edge of the start bit can enter the CP end of flip-flop 131', setting Q end as the high level output. 131' is reset by the pulse on line 120' in the same way. Resistor 134' is used to prevent the false triggering of the window device when the serial CECO-data bus is under high impedance. Two inputs of OR gate 135' indicate respectively read/write between the window device and the IDB. Therefore the outputs of OR gate 135' represent the duration for the shifting process of shift register 126'. In this duration, the frequency of shifting pulses is at baud rate.

The output signal of gate 135' allows the clock to enter baud-rate-generator 137' through gate 136' and to enable it to count. Baud-rate-generator 137' is actually a counter with the frequency designated by any method known by the person skilled in the field. It sends out two pulse series. One of them is an integer series N (N=1, 2, ... 10) and another one is a semi-integer series N-0.5 (N=1, 2, ... 10). These series are used for parallel to serial transmitting and serial to parallel receiving respectively. The selection of receiving or transmitting is controlled by multiplex switch 138' in accordance with the output level of DL 130'. Selected pulse train is sent to shifting-control-line 121', controlling the shifting of shift register 126'. 10-bit counter 139' responds to the integer pulse series generated by baud-rate-generator 137' and to generate an overflow pulse on line 120' used to reset the related parts when a transmitting/receiving process of the serial shifting is over.

Shift register 126' contains 8-bit data bits, a start bit and a stop bit. When operating, the start bit signal is fed to a tri-state inhibitor gate 127' and data is fed to the stop bit from serial CECO-data bus 110'. The positive level on control line 119' ensures for the data in 8-bit data bits to be serially sent to serial CECO-data bus 110'. The contents on the IDB is locked on register 126' by the rising edge of the positive level on line 128' and when the signal on line 128' keeps on high level, the contents of the IDB has no influence on register 126' so that the shift is carried out correctly. Two inputs, 119' and 123', of OR gate 129' are used for isolating register 126' from the IDB under the shifting conditions of parallel to serial or serial to parallel respectively. The signal on line 123' indicates that during the MC period the window device is under serial to parallel receiving condition and the data is transferred in parallel from the shift registers 126' to the IDB. According to the protocol, the start bit of register 126' is set to high level and the stop bit of register 126' is set to 0. The shift register 126' is operated by the pulses on shift-control-line 121'. In this example, 10 shift pulses are needed to perform the shift of a byte.

FIG. 11D is the waveform diagram of an asynchronous serial window device within the period of a MC. It is helpful to understand the operation of the window device shown in FIG. 11C.

The reliability of the receiving/transmitting process is relied on the receiving rather than the transmitting. It is important whether the M-0.5 series can start at the first rising edge of 131' to calculate the instant of ½ baud rate or not. Therefore, the lower the baud rate (the baud rate is described by 2Tc/bit, in FIG. 11D), the higher the reliability. Or the higher the CLK frequency, the higher the reliability. Time accumulation resulting from frequency differences among cell computers may be eliminated by the correlative waiting procedure among the CPUs. At the conclusion of each serial byte, the time accumulation resulting from frequency differences can be restricted in a small range that can be tolerable by the system. (In this figure, the timing of the transmission and the reception between cell computers is different but the end of the communications are correlated.) The shaded parts of signals WV*DI and Wait (111') in this diagram show an example of the asynchronism in the MC of the receiving computers.

As shown in FIG. 11D, each window device, controlled by the leading edge of signal WV, generates a waiting signal, making the CPU enter Tw clock cycle. If there is no serial transmission among WDs, the CPUs execute independently their MC. No cooperation occurs until the occurrence of the next WV.

On the arrival of the WV*DO signal at the WD, the DL device in the WD is triggered, outputting a delayed signal to OR gate 135'. The OR gate in turn gives an output signal 118' for starting the serial shifting. During the period of keeping the signal level active on 118', the WD remains at the condition of serial output.

For waveforms of the lower part of FIG. 11D, the window device is under reception of status. While DL has no output the serial shifting begins responding to the edge of the start bit of the serial data received, regardless of the arrival time of the WV*DI signal from this CPU. Hence care should be taken to prevent false triggering from CECO-bus 110'.

The bits are transmitted at the pre-determined baud rate by the window device controlled by the WV*DO signal. (Only the window device of one cell computer in the CECOPUTER system is controlled by the signal WV*DO. The baud rate for different MCs may be different and are determined by the pre-determined protocol between the transmitting terminal and the receiving terminal. After a byte has been shifted (may be 10 bits for an 8-bits byte), the overflow signal generated by the counter of each window device itself finishes the shifting for data transmission or data reception. The TW status of the CPUs is then released so that the execution of MC can be continued.

Figure 12A:
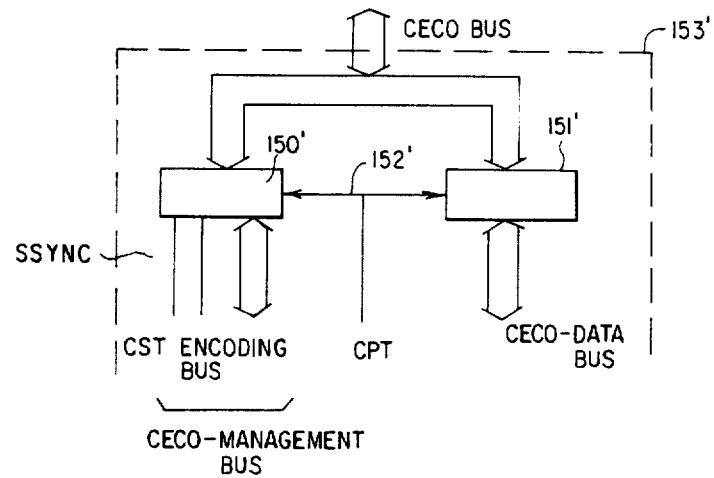
FIG. 12A is an embodiment of CECO-bus in the CECOPUTER system according to this invention.

FIG. 12A is an embodiment of the CECO-bus in the CECOPUTER system according to this invention. The CECO-data bus and the CECO-management bus of the CECO-bus are merged into a bus structure under the mode of time-sharing multiplexing. Therefore, the CECO-bus is simplified and is more conveniently integrated. Generally, the width of the CECO-bus is determined by that of the CECO-data bus. For a synchronized parallel window device the width of the CECO-bus is the same as the width of the IDB. For an asynchronous parallel WD, the width of the CECO-bus is $I+1$; the width of IDB is I. For an asynchronous serial window, the CECO-bus is only one signal bus.

In the simplest example two bi-directional inhibit switches 150' and 151' control the connection of the CECO-bus with the CECO-management bus and CECO-data bus respectively. Switches 150' and 151' are under the control of the signal on line 152' so that when the CPT signal on line 152' is at high level, 151' conducts and the CECO-bus is held by the CECO-data bus. Conversely the CECO-bus is held by the CECO-management bus.

The CECO-data bus and CECO-management bus with the said structure make themselves more likely to be included within the structure of cell computer 153'.

Figure 12B:
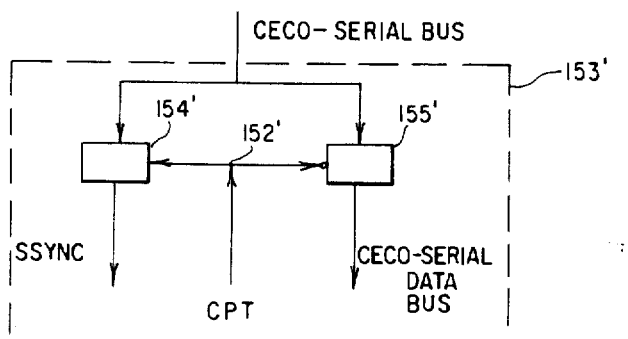
FIG. 12B is another embodiment of CECO-bus in the CECOPUTER system according to this invention.

FIG. 12B is another embodiment of the CECO-bus structure in the CECOPUTER system according to this invention. In asynchronous serial operation, only one signal line is needed for the CECO-data bus. The CECO-management bus is simplified to only one line SSYNC. The CECO-bus and the SSYNC line are merged into the serial CECO-bus by time-sharing multiplexing. In the simplest case, bi-directional tri-state inhibit switches 154' and 155' are 1-bit only. The functions of the CPT signal on the control line 152' are the same as shown in FIG. 12A.

The CECO-bus uses only one signal line in this type of structure. It is an advantage to set up a CECOPUTER system in a range of distance.

The CECO-bus described in this invention can be realized by other techniques other than wires and cables. However, related techniques may be used for signal conversion or physical structure conversion, e.g. optical fiber, telephone network, etc. No matter what method is used the signal inputting the cell-computers or the signals sent out by the cell computers are consistent with the said definition and formats.

Figure 13A:
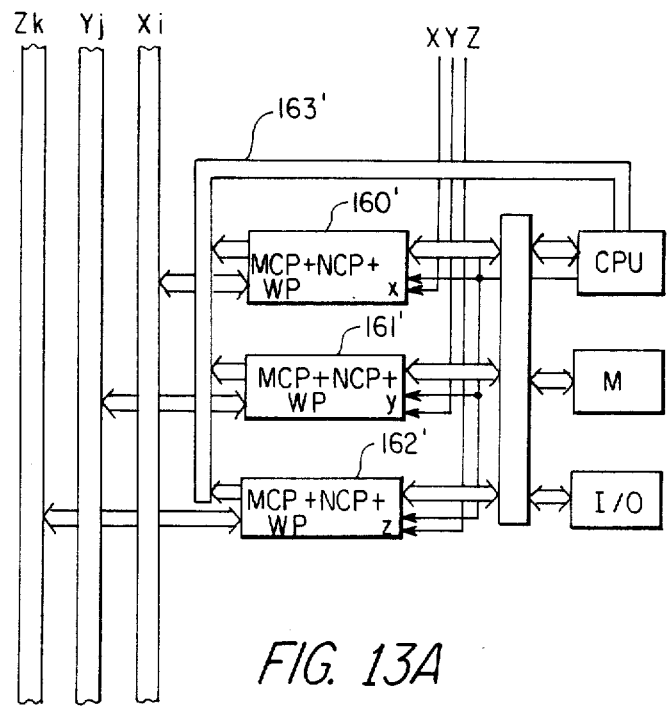
FIG. 13A shows a "dimensional device" that consists of WD, MCD and NCD and a block diagram of multi-dimensional interfaces of a cell-computer constructed by the dimensional devices.

FIG. 13A shows a "dimensional device" that consists of WD, MCD and NCD and a schematic block diagram of the multi-dimensional interfaces of the cell computer constructed by the dimensional devices, wherein, Xi, Yj and Zk are the CECO-buses for respective dimensions.

A set of dimensional-devices comprises 160'-162' (only three dimensions in FIG. 13A). X, Y, and Z the chip select signals from the CECOPUTER system used for selecting the dimensional-devices. Only one of these dimensional-devices can be selected at one time for cooperative operation with the CPU. Those dimensional-devices unselected present high impedance to respective buses. The selected dimensional-device sends out signals SUNC, $\overline{ch}$/fo and CPT to the CPU via line 163'. The CPU generates four CECO-MCfactor signals, in which two signals for controlling window devices are sent to all dimensional-devices. However only the selected dimensional-device responds to them and the others are kept idle. Another two signals are used to adjust the devices (such as memory, etc.) on the IDB and their functions have been mentioned above. From the point of view of architecture, the number of dimensional-devices is unlimited, but only one dimensional-device is allowed to operate cooperatively with the CPU at one time and this rule is executed by the chip selecting signal of the dimensional device. Once the dimensional-device is selected, the operation mode in the specific dimension is the same as described previously in this invention. Multi-dimensional-devices make the cell computers able to operate in time-sharing and are connected to a number of CECO-buses to be capable of operating cooperatively under CECO-instructions. Then a combination of multi-CECOPUTER systems and the management of the chief computers on different levels are formed.

Since the WD, MCD and NCD may consist of various kinds and structures, many types of configurations for the dimensional-devices are possible. In order to reduce the wiring complexity of the system, the CECO-data bus and CECO-management bus for each dimension may be designed as a time-sharing multiplex bus. Actually they are operated already in different time. Therefore the multiplexing of buses may reduce the number of wires used in CECO-buses of all dimensions and the complexity in system cabling and be beneficial for multi-computer architecture.

Figure 13B:
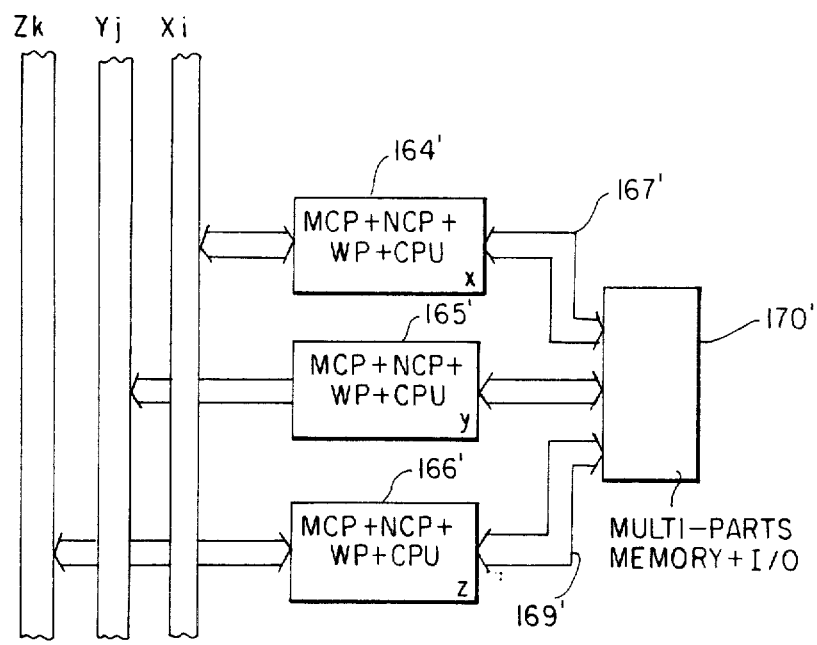
FIG. 13B is a block diagram of another embodiment of the combination of multi-port memory and "dimensional devices" (including CPU according to this invention.

FIG. 13B is a block diagram of another embodiment of the combination of "dimensional-devices" (including CPU) and multi-port memories according to this invention. 164'-166' are "dimensional-devices" (including the CPU and dimensional-devices said in FIG. 13A). Each of the buses 167'-169' includes an address bus, a data bus, and a control bus. Then this system is a configuration of shared memories, parts 164'-166' can execute CECO-instr. simultaneously and time-sharing of dimension is no longer needed. The system has the advantages of ease of management, nice concurrency, and suitability for multi-computer system at higher speed. From the point of architecture, the said elements are also suitable for implementing with single chip computers.

We claim:

1. A homogeneous multi-computer system, comprising:
   (a) a system bus, further comprising a system data bus for transmitting data and a system management bus for transmitting system management signals; and (b) a plurality of cell-computers having identical architecture, performing operations in machine cycle (MC) periods, and being connected to said system bus, each said cell-computer further comprising:
  (i) a window device, WD, connected between an internal data bus, IDB, of said cell-computer and said system data bus, for controlling the on-and-off states of said system data bus to said IDB in each MC period;
  (ii) an encoding and selecting device, NCD, connected to said IDB and said system management bus, receiving a signal CST from the system management bus, and generating a selected signal NCS representative of a match of code sent by said system management bus with a code of the present computer;
  (iii) a multi-computer control device, MCD, responding to said selected signal NCS from said NCD, and said CST signal, after passing through NCD, and generating a set of control signals ($\overline{ch}$/fo, SYNC, CPT) and an SSYNC signal to each cell-computer via said system management bus for causing said cell-computer to enter a synchronous state; and
  (iv) a central processing unit, CPU, responding to the set of control signals from said MCD within the same cell, for continuously generating signals during each machine cycle period to control whether said IDB and said system data bus are connected for data transmission and whether a memory device, and I/O device and said CPU are of high impedance with respect to said IDB.

2. The system of claim 1, wherein when operating as a multi-computer, CECOPUTER, said MCD of a cell computer designates a chief computer from the control signal, $\overline{sch}$/fo received and the remainder of cell computers are designated as follow computers.

3. The system of claim 1, wherein the number of said system buses equals the number of said system data buses and said system bus comprises:
  (a) a switching device, responding to the CPT signal of said control signals sent by said MCD, for converting said system bus at different times into said system data bus and said system management bus respectively.

4. The system of claim 1, wherein said MCD of said cell-computer is triggered by an external voltage, such that when a status indicating signal $\overline{ch}$/fo generated by said MCD is low level, said cell-computer is set to be a chief computer of said system, whereas when the status indicating signal $\overline{ch}$/fo generated by said MCD of said cell-computer is high level, said cell-computer is set to be a follow computer.

5. The system of claim 4, wherein said system management bus comprises:
  (a) a conductive line for transmitting a CST signal passing from the NCD of said chief computer to each cell-computer, said CST signal being used for triggering the MCD of each cell-computer;
  (b) a conductive line for transmitting a signal SSYNC sent by the MCD of said chief computer to the MCD of each cell-computer; and
  (c) a set of conductive lines for transmitting the code signals delivered by said chief computer.

6. The system of claim 4, wherein said system management bus comprises a bus connected to each cell-computer for transmitting the signal SSYNC from said MCD of said chief computer, said signal causing said cell-computers to enter a synchronous state.

7. The system of claim 6, wherein said MCD of said chief computer, responding to said CST signal from said system management bus, generates said SSYNC signal and signals controlling said CPU of said chief computer, and said MCD of each said follow computer, responding to the SSYNC signal generated by said MCD of said chief computer and transmitted via said system management bus, generates a set of control signals controlling said CPU of each said follow computer.

8. The system of claim 5, wherein said NCD comprises:
  (a) an encoding device, connected to said IDB of the chief computer, responding to the status indicating signal $\overline{ch}$/fo generated by said MCD of the chief computer, that enables the CST signal to be transmitted to the MCD of the same cell computer via the system management bus, a strobing pulse and a set of codes;
  (b) a logic comparator, for comparing the code sent by said encoding device and transmitted from said system management bus with the local code of the present computer and generating an output signal if they are equal;
  (c) a strobing device, responding to the output signal of said logic comparator, for generating a strobing signal under the trigger of a signal transmitted from said system management bus; and
  (d) a strobing register for generating said selected signal NCS under the trigger of said strobing signal and ending said NCS signal under the trigger of a strobing register reset signal transmitted from said system management bus.

9. The system of claim 4, wherein said MCD comprises:
  (a) a status register, responding to an external level signal or said NCS signal, for generating said status indicating signal $\overline{ch}$/fo;
  (b) an SSYNC pulse generator, responding to said signal sent by said status register and said CST signal transmitted by said system management bus, for generating said pulse signal SSYNC; and
  (c) means, responding to said SSYNC signal sent by said SSYNC pulse generator of said chief computer, for generating said synchronous pulse signal SYNC and said CPT signal under the control of the NCS signal sent by said NCD.

10. The system of claim 7, wherein said CPU of each said follow computer, responding to PC-addressing machine cycle of said CPU of said chief computer, shares content of PC-addressing bytes of said CPU of said chief computer.

11. The system of claim 10, wherein said CPU comprises:
  (a) a plurality of additional encoding arrays consisting of ROM and RAM programmed by the user, that receives a control signal, CPT sent by said MCD $\overline{ch}$/fo signal and a signal from a page indicator, this control signal translation generates computer operation signals in non-PC-addressing machine cycle of said chief computer, which said computer operating signals being sent to memory, said window device and said CPU within said cell-computer respectively to control the effectiveness of the read and write states of said CPU of cell computer, said set of signals comprising:

(i) CV: read and write to said IDB by said CPU being valid;
(ii) CE: read and write to said IDB by said CPU being escape;
(iii) MV: read and write to said IDB by memory and I/O unit of said cell-computer being valid;
(iv) ME: read and write to said IDB by memory and I/O unit of said cell-computer being escape;
(v) WV: said window device being valid;
(vi) WE: said window device being escape;
(vii) DI: data entering said IDB via said window device; and
(viii) DO: data being sent out to said system data bus via said window device.

12. The system of claim 11, further comprising:
(a) a CECO-MC-factor generator, responding to said signal $\overline{ch}/fo=0$ and said signal $CPT=1$, for generating a set of CECO-MC-factor signals (CV, MV, WV, DO) with fixed combinational relation in said chief computer during the PC-addressing machine cycle of said CPU of said chief computer, said set of signals being sent to memory and said window device of said chief computer respectively to control the effectiveness of the read and write states of said CPU of said chief computer and to keep internal read machine cycles of said cell-computer unchanged, causing said window device of said chief computer to be conductive and to send data on said IDB of said chief computer to said system data bus.

13. The system of claim 11, further comprising a CECO-MC-factor generator, responding to said signal $\overline{ch}/fo=1$ and said signal $CPT=1$, for generating a set of CECO-MC-factor signals (CV, MV, WV, DI) with fixed combinational relation by said CPU of each said follow computer in the PC-addressing machine cycle of said CPU of said chief computer, said set of signals being sent to memory and said window device of a follow computer to control the effectiveness of the read and write states of said CPU of the follow computer, causing said memory and I/O devices of the follow computer to appear to their IDB to be in high impedance states, and causing said window device of the follow computer to become conductive to allow data on said system data bus into its IDB.

14. The system of claim 11, further comprising a CECO-MC-factor generator for generating a set of CECO-MC-factor signals (CV, MV, WE, -) with fixed combinational relation on receiving said signal $CPT=0$, said set of signals being sent to memory and said window device of said cell computer respectively to control the effectiveness of the read and write states of its CPU, causing the cell-computer in said system to be in a conventional individual computer operating state.

15. The system of claim 1, wherein
(a) said system data bus is a single bus for serial data transmission; and
(b) each said window device is connected between said IDB of each said cell-computer and said system data bus for converting serial data on said system data bus into parallel data and transmitting said data to said IDB, or converting parallel data on said IDB into serial data and transmitting said data to said system data bus under the control of said CPU.

16. A homogeneous multi-computer system comprising:
(a) a system bus, comprising:
(i) a system data bus for transmitting data; and
(ii) a system management bus for transmitting system management signals; and
(b) a plurality of cell-computers, architecture of each cell-computer being homogeneous and each cell-computer being connected to said system bus, each said cell-computer further comprising:
(i) a window device, WD, connected between an internal data bus IDB in said cell-computer and said system data bus for controlling the on-and-off states of said system data bus with said IDB;
(ii) an encoding and selecting device NCD; comprising:
(1) an encoding device connected to said IDB, responding to the status indicating signal $\overline{ch}/fo$ set by an external voltage, for generating a square wave transmitted to each said cell-computer by said system management bus, a strobing pulse and a set of codes;
(2) a logic comparator for comparing the code sent by said encoding device and transmitted by said system management bus with local code of the present computer and generating an output signal when they match with each other;
(3) a strobing device, responding to the output signal of said logic comparator, for generating a strobing signal triggered by a signal transmitted via said system management bus; and
(4) a strobing register for generating said selected signal NCS triggered by said strobing signal and ending said NCS signal triggered by a register reset signal transmitted via said system management bus;
(iii) a multi-computer control device MCD, comprising:
(1) a status register, responding to an external level signal or said NCS signal, for generating a status indicating signal—$\overline{ch}/fo$;
(2) an SSYNC pulse generator, responding to said signal sent by said status register and said CST signal transmitted by said system management bus, for generating a wide pulse signal SSYNC; and
(3) a signal generator, responding to said SSYNC signal, for generating a synchronous pulse signal SYNC and a state signal CPT under the control of the NCS signal sent by said NCD;
(iv) a CPU, comprising a plurality of additional decoding arrays consisting of ROM's, responding to said signal CPT sent by said MCD, $\overline{ch}/fo$ signal and a signal from a page indicator, for generating a set of CECO-MC-factor signals, said set of signals being sent to memory and said window device respectively to control the masking of the read and write states of said CPU, said CECO-MC-factor signal comprising:
(1) CV: read and write to said IDB by said CPU being valid;
(2) CE: read and write to said IDB by said CPU being escape;
(3) MV: read and write to said IDB by memory and I/O unit of said cell-computer being valid;
(4) ME: read and write to said IDB by memory and I/O unit of said cell-computer being escape;
(5) MV: said window device being valid;
(6) WE: said window device being escape;
(7) DI: data entering said IDB via said window device; and (8) DO: data being sent out to said system data bus via said window device; and (v) a specific CECO-MC-factor generator, responding to said signal $\overline{ch}/fo=0$ and signal CPT=1, for generating a set of CECO-MC-factor signals (CV, MV, WV, DO) with fixed combinational relation in the PC-addressing machine cycle of said CPU of a said cell-computer, said set of signals being sent to memory and said window device respectively to control the effectiveness of the read and write states of said CPU and to keep an internal read machine cycle of said cell-computer unchanged, causing said window device to become conductive and transmitting the data on said IDB to said system data bus; and while said signals $\overline{ch}/fo=1$ and CPT=1 are being responded to, said CECO-MC-factor generator generates a set of CECO-MC-factor signals (CV, ME, WV, DI) with fixed combinational relation in the PC-addressing machine cycle of said CPU of said cell-computer, said set of signals being sent to memory and said window device respectively to control the effectiveness of the read and write of said CPU, causing said memory and I/O devices to appear to be in high impedance states to said IDB and causing said window device to become conductive, to allow data on said system data bus into said IDB; further, while signal CPT=0, said specific CECO-MC-factor generator generates a set of CECO-MC-factor signals (CV, MV, WE) with fixed combinational relation, and said set of signals is sent to said memory and window devices respectively to control the effectiveness of the read and write states of said CPU, causing said cell-computers in said system to be in conventional individual computer operating status.

17. A computer for a multi-computer system, wherein said multi-computer system comprises a plurality of homogeneous computers, a data bus for transmitting data and a management bus for transmitting system management signals, said data bus and management bus being connected to each computer, and further comprising:
(a) a window device, connected between an internal data bus IDB of said computer and said data bus, for controlling the on-and-off states of said data bus with said IDB;
(b) a monostable pulse generator, that responds to a signal sent by a CPU of said computer via an I/O unit, that generates a wide pulse signal SSYNC;
(c) an 'AND' gate device for performing logical AND operation on said wide pulse signal SYNC sent by said monostable pulse generator and a signal RSYNC generated by said CPU and sending a result signal, wherein said signal RSYNC is generated by said CPU in response to wide pulse signal SYNC sent by said monostable pulse generator after the execution of the current instruction at the arrival of said SYNC signal;
(d) a D trigger for generating a level signal CPT at its output terminal, triggered by the level signal sent by said AND gate device; and
(e) the CPU, responding to said SYNC signal and CPT signal, continuously generates control signals in each machine cycle to determine whether said IDB and said data bus are on and whether or not said CPU, memory and I/O devices are in a high impedance state to said IDB.

18. The computer of claim 17, wherein when the externally setting voltage $\overline{ch}/fo$ applied to said CPU is low level, said computer is set as a chief computer, and while said setting voltage $\overline{ch}/fo$ applied to said CPU is high level, said computer is set as a follow computer.

19. The computer of claim 18, wherein said CPU further comprises:
(a) a plurality of additional decoding arrays consisting of ROM's, responding to said signal CPT sent by said D trigger and said SYNC signal sent by said monostable pulse generator, for generating a set of CECO-MC-factor signals in non-pc-addressing machine cycle of said chief computer, said set of signals being sent to memory and said window device respectively to control the effectiveness of the read and write states of said CPU, said CECO-MC-factor signal comprising:
  (i) CV: read and write to said IDB by said CPU being valid;
  (ii) CE: read and write to said IDB by said CPU being escape;
  (iii) MV: read and write to said IDB by memory and I/O unit of said computer being valid;
  (iv) ME: read and write to said IDB by memory and I/O unit of said computer being escape;
  (v) WV: said window device being valid;
  (vi) WE: said window device being escape;
  (vii) DI: data entering said IDB via said window device; and
  (viii) DO: data being sent out to said bus via said window device.

20. The computer of claim 19, wherein said I/O device is under the control of said CPU for sending a pulse signal to trigger cp terminal of said D trigger, causing Q output terminal of said D trigger to be zero level for ending said CPT signal (i.e. CPT=0).

21. The computer of claim 19, further comprising:
(a) a specific CECO-MC-factor generator, responding to signals $\overline{ch}/fo=0$ and CPT=1, for generating a set of CECO-MC-factor signals (CV, MV, WV, DO) with fixed combinational relation in said chief computer during pc-addressing machine cycle of said CPU of said chief computer, said set of signals being sent to memory and said window device to control the effectiveness of the read and write states of said CPU and to keep internal read machine cycle of said computer unchanged, causing said window device to become conductive and transmitting data on said IDB to said data bus via said window device.

22. The computer of claim 19, further comprising:
(a) a specific CECO-MC-factor generator, responding to signals $\overline{ch}/fo=0$ and CPT=1, for generating a set of CECO-MC-factor signals (CV, ME, WV, DI) with fixed combinational relation in a said follow computer during PC-addressing machine cycle of said CPU of said chief computer, said set of signals being sent to memory and said window device to control the effectiveness of the read and write state of said CPU, causing said memory and I/O device to present high impedance to said IDB and causing said window device to become conductive to allow the data on said data bus to be transmitted to said IDB via said window device.

23. The computer of claim 20, further comprising:

(a) a specific CECO-MC-factor signal generator, for generating a set of CECO-MC-factor signals (CV, MV, WE) with fixed combinational relation when said signal CPT=0, said set of signals being sent to memory and said window device respectively to control the effectiveness of the read and write states of said CPU, causing said computer to be in independent operating status.

24. The computer of claim 17, wherein
(a) said data bus comprises a bus for serially transmitting data; and
(b) each said window device is connected between said IDB of each said cell-computer and said data bus, for converting the serial data on said data bus into parallel data and transmitting them to said IDB, or serially transmitting the parallel data on said IDB to said data bus under the control of said CPU.

25. A computer for a multi-computer system, wherein said multi-computer system comprises a plurality of homogeneous computers, a data bus and a management bus connected to multiple computers for transmitting data and management signals respectively, further comprising:
(a) a window device, connected between an internal data bus (IDB) of said computer and said data bus, for controlling the on-and-off states of said data bus with said IDB;
(b) a monostable pulse generator, responding to the signals sent by a CPU via an I/O unit, for generating a wide pulse signal SYNC;
(c) an 'AND' gate device for performing and 'AND' logical operation on said wide pulse signal SYNC sent by said monostable pulse generator with a signal RSYNC generated by the CPU to generate an output signal, wherein said RSYNC signal is a level sent by said CPU in response to the signal SYNC sent by said monostable pulse generator after the execution of the current instruction at the arrival of said SYNC signal;
(d) a D trigger, set by the level signal sent by said 'AND' gate device, for generating a level signal CPT at its Q output terminal;
(e) a CPU comprising a plurality of additional decoding arrays consisting of ROM's, responding to said CPT signal sent by said D trigger and the SYNC signal sent by said monostable pulse generator, for generating a set of CECO-MC-factor signals in non-pc-addressing machine cycle of said computer, said set of signals being sent to its memory and said window device to control the effectiveness of the read and write states of said CPU of the computer, said CECO-MC-factor signals comprising:

(i) CV: read and write to said IDB by said CPU being valid;
(ii) CE: read and write to said IDB by said CPU being escape;
(iii) MV: read and write to said IDB by memory and I/O unit of said cell-computer being valid;
(iv) CE: read and write to said IDB by said CPU being escape;
(v) MV: read and write to said IDB by memory and I/O unit of said cell-computer being valid;
(vi) ME: read and write to said IDB by memory and I/O unit of said cell-computer being escape;
(vii) WV: said window device being valid;
(viii) WE; said window device being escape;
(ix) DI: data entering said IDB via said window device; and
(x) DO: data being sent out to said bus via said window device;

(f) a specific CECO-MC-factor signal generator, responding to an external level signal $\overline{ch}/fo=0$ and signal CPT=1, for generating a set of CECO-MC-factor signals (CV, MC, WV, DO) with fixed combination relation, said set of signals being sent to memory and said window device respectively to control the effectiveness of the read and write states of said CPU and to keep internal read machine cycle of said computer unchanged, causing said window device to become conductive and transmitting the data on said IDB to said data bus via said window device; further, said CECO-MC-factor signal generator, when responding to an external level signal $\overline{ch}/fo=1$ and signal CPT=1, said CECO-MC-factor generator generates a set of CECO-MC-factor signals (CV, ME, WV, DI) with fixed combinational relation, said set of signals being sent to memory and said window device respectively to control the effectiveness of the read and write states of said CPU, causing said memory and I/O devices to present high impedance states to said IDB and causing said window device to be conductive to allow the data on said data bus into said IDB via said window device; and further when a cp terminal of said D trigger is triggered by a pulse signal sent by said CPU via said I/O device, thereby causing a Q terminal of said D trigger to be zero (CPT=0), said CECO-MC-factor generator generates a set of CECO-MC-factor signals (CV, MV, WE, -) with fixed combinational relation, said set of signals being sent to memory and said window device to control the effectiveness of the read and write signals of said CPU, causing said computer to stay in conventional independent computer operating status.

* * * * *